United States Patent
Giraldo et al.

(10) Patent No.: US 12,209,042 B2
(45) Date of Patent: *Jan. 28, 2025

(54) SYSTEM AND METHOD FOR RECOVERING NUTRIENTS FROM A HIGH NITROGENOUS LIQUID WASTE

(71) Applicants: NUORGANICS LLC, Robbinsville, NJ (US); Gabriel Howard Giraldo-Wingler, Robbinsville, NJ (US)

(72) Inventors: Eugenio Giraldo, Robbinsville, NJ (US); Barbara Jean Wingler, Robbinsville, NJ (US); Gabriel Howard Giraldo-Wingler, Robbinsville, NJ (US)

(73) Assignees: NUORGANICS LLC, Robbinsville, NJ (US); Gabriel Howard Giraldo-Wingler, Robbinsville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,332

(22) Filed: Nov. 22, 2023

(65) Prior Publication Data

US 2024/0083792 A1  Mar. 14, 2024

Related U.S. Application Data

(63) Continuation of application No. 17/972,524, filed on Oct. 24, 2022, now Pat. No. 11,858,839, which is a
(Continued)

(51) Int. Cl.
*C02F 3/30* (2023.01)
*C02F 1/66* (2023.01)
(Continued)

(52) U.S. Cl.
CPC .......... *C02F 3/302* (2013.01); *C02F 1/66* (2013.01); *C02F 3/28* (2013.01); *C02F 3/308* (2013.01);
(Continued)

(58) Field of Classification Search
CPC .... C02F 3/302; C02F 1/66; C02F 3/28; C02F 3/308; C02F 1/722; C02F 1/727;
(Continued)

(56) References Cited

U.S. PATENT DOCUMENTS 5,656,059 A   8/1997  Monster et al.
7,674,379 B2  3/2010  Vanotti et al.
(Continued)

FOREIGN PATENT DOCUMENTS

CA   2416690 C    8/2008
CA   2992063 A1 * 7/2018  ............. B01D 53/46
(Continued)

OTHER PUBLICATIONS

Machine generated English translation of CN-110627314, generated on Jan. 16, 2024.*

(Continued)

*Primary Examiner* — Fred Prince
(74) *Attorney, Agent, or Firm* — Lando & Anastasi, LLP

(57) ABSTRACT

Methods of recovering nutrients from a high nitrogenous liquid waste are disclosed. The methods include collecting the high nitrogenous liquid waste, introducing the high nitrogenous liquid waste and an oxidant into a reactor to produce oxy-anions of nitrogen, maintaining a predetermined pH to control concentration of the oxy-anions of nitrogen, and concentrating the liquid to produce a concentrated product and a dilute water. Systems for recovering nutrients from a high nitrogenous waste are also disclosed. The systems include a solids-liquid separator, a reactor
(Continued)

having an inlet fluidly connected to the solids-liquid separator and an inlet fluidly connected to a source of an oxidant, a pH control subsystem, and a dissolved solids concentrator.

45 Claims, 14 Drawing Sheets

Related U.S. Application Data continuation of application No. PCT/US2021/028984, filed on Apr. 23, 2021.

(60) Provisional application No. 63/015,323, filed on Apr. 24, 2020.

(51) Int. Cl.
| | | |
|---|---|---|
| *C02F 1/72* | (2023.01) | |
| *C02F 1/76* | (2023.01) | |
| *C02F 3/28* | (2023.01) | |
| *C05F 3/00* | (2006.01) | |
| *C05F 5/00* | (2006.01) | |
| *C05F 7/00* | (2006.01) | |
| *C02F 103/20* | (2006.01) | |

(52) U.S. Cl.
CPC .............. *C02F 1/722* (2013.01); *C02F 1/727* (2013.01); *C02F 1/76* (2013.01); *C02F 2103/20* (2013.01); *C02F 2209/02* (2013.01); *C05F 3/00* (2013.01); *C05F 5/00* (2013.01); *C05F 7/00* (2013.01); *Y02A 40/20* (2018.01); *Y02P 20/145* (2015.11); *Y02W 10/10* (2015.05); *Y02W 30/40* (2015.05)

(58) Field of Classification Search
CPC .... C02F 1/76; C02F 2103/20; C02F 2209/02; C05F 3/00; C05F 5/00; C05F 7/00; Y02A 40/20; Y02P 20/145; Y02W 10/10; Y02W 30/40
See application file for complete search history.

(56) References Cited

U.S. PATENT DOCUMENTS

| | | | |
|---|---|---|---|
| 8,986,632 B2 | 3/2015 | Liu et al. | |
| 9,045,355 B2 | 6/2015 | Kumar et al. | |
| 9,328,006 B2 | 5/2016 | Burke | |
| 10,023,501 B2 | 7/2018 | Bisson et al. | |
| 10,053,384 B2 | 8/2018 | Robertson et al. | |
| 10,125,428 B2 | 11/2018 | Barak | |
| 10,513,466 B2 | 12/2019 | Giraldo et al. | |
| 10,556,837 B2 | 2/2020 | Love et al. | |
| 10,889,528 B2 | 1/2021 | Love et al. | |
| 11,639,317 B2 | 5/2023 | Love et al. | |
| 11,639,318 B2 | 5/2023 | Love et al. | |
| 2003/0070986 A1 | 4/2003 | Braun | |
| 2005/0035059 A1 | 2/2005 | Zhang et al. | |
| 2009/0242482 A1 | 10/2009 | Buelna et al. | |
| 2009/0282882 A1 | 11/2009 | Verhave et al. | |
| 2013/0019645 A1 | 1/2013 | Crabtree et al. | |
| 2014/0033776 A1 | 2/2014 | Josse et al. | |
| 2016/0355444 A1 | 12/2016 | Olkowski et al. | |
| 2017/0174577 A1 | 6/2017 | Blaney | |
| 2018/0354867 A1 | 12/2018 | Giraldo et al. | |
| 2018/0362414 A1 | 12/2018 | Love et al. | |
| 2019/0270679 A1 | 9/2019 | Blaney | |

FOREIGN PATENT DOCUMENTS

| | | | | |
|---|---|---|---|---|
| CN | 102107996 A | * | 6/2011 | |
| CN | 110627314 A | * | 12/2019 | ................ C02F 9/00 |
| DK | 178419 B1 | | 2/2016 | |
| JP | 2009126744 A | * | 6/2009 | |
| KR | 20060067886 A | | 6/2006 | |
| KR | 2009-0051450 A | | 5/2009 | |
| KR | 2017-0009155 A | | 1/2017 | |
| WO | 199954268 A1 | | 10/1999 | |
| WO | 03086977 A1 | | 10/2003 | |
| WO | 2013013247 A2 | | 1/2013 | |
| WO | 2018185025 A1 | | 10/2018 | |
| WO | 2021217094 A1 | | 10/2021 | |

OTHER PUBLICATIONS

Machine generated English translation of JP-2009126744, generated on Jan. 16, 2024.*
Machine-generated English translation of CN 102107996, generated on Jun. 28, 2024.*
International Search Report and Written Opinion from International application No. PCT/US2021/028984 dated Jul. 20, 2021.
Harder, R. et al. Recycling Nutrients Contained in Human Excreta to Agriculture: Pathways, Processes and Products. Jan. 2019 Critical Reviews in Environmental Science and Technology, 49:8, 695-743.
Mehta, C. et al. Technologies to Recover Nutrients from Waste Streams: A Critical Review. Feb. 2015 Biocontrol Science and Technology, 45(4) 385-427.
Ye, Y. et al. A Critical Review on Ammonium Recovery from Wastewater for Sustainable Wastewater Treatment. Bioresour Technol. Nov. 2018;268:749-758/j.biortech.2018.07.111 Epub Jul. 25, 2018.
Xie, M. et al. Membrane-Based Processes for Wastewater Nutrient Recovery: Technology, Challenges and Future Direction. Water Res. Feb. 1, 2016;89:210-21/j.watres.2015.11.045. Epub Nov. 22, 2015.
Zarebska, A. et al. Ammonium Fertilizers Production from Manure: A Critical Review. Sep. 2014 Critical Reviews in Environmental Science and Technology. 45(14) 1469-1521.
Extended European Search Report from corresponding European Application No. 21791729.3 dated Apr. 30, 2024.

* cited by examiner

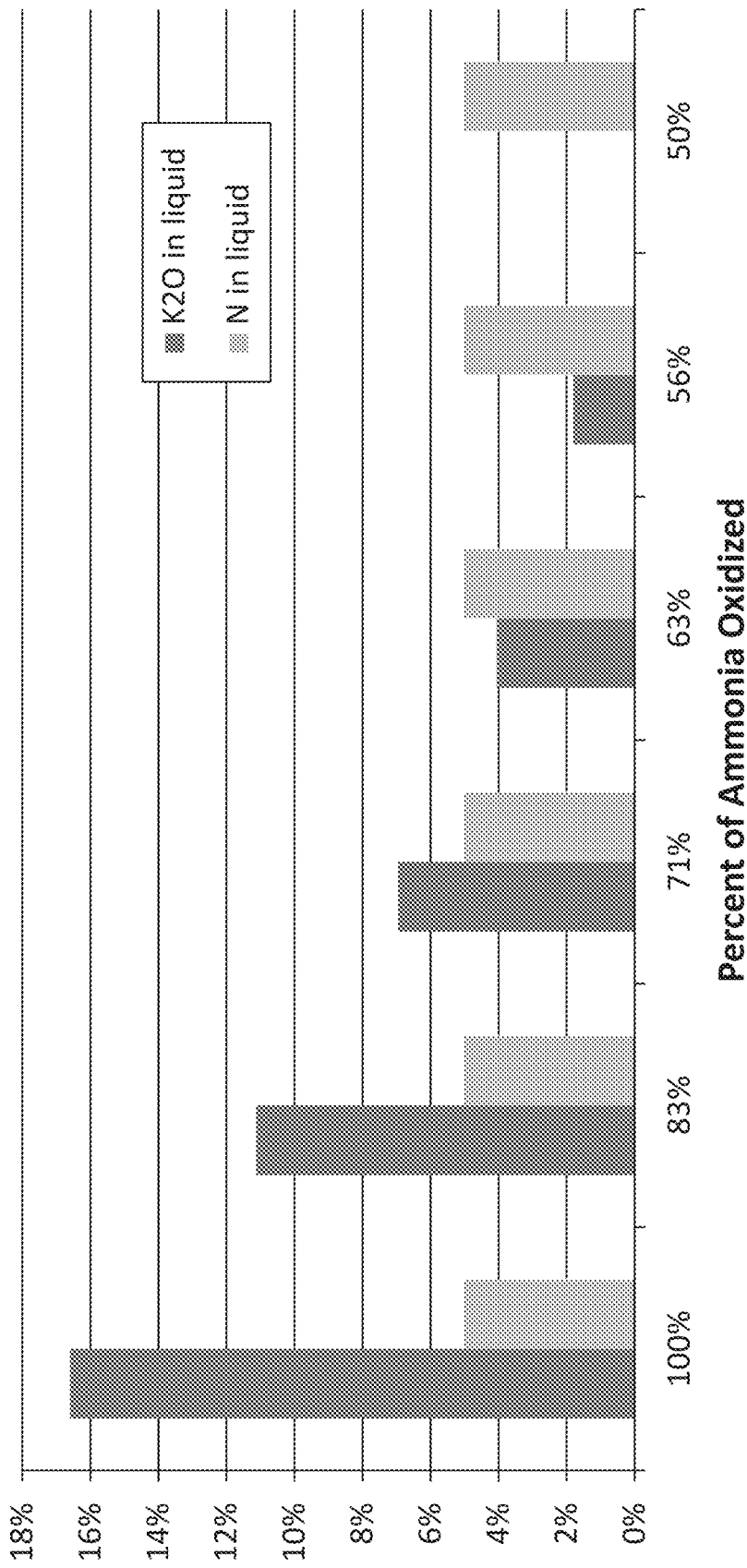

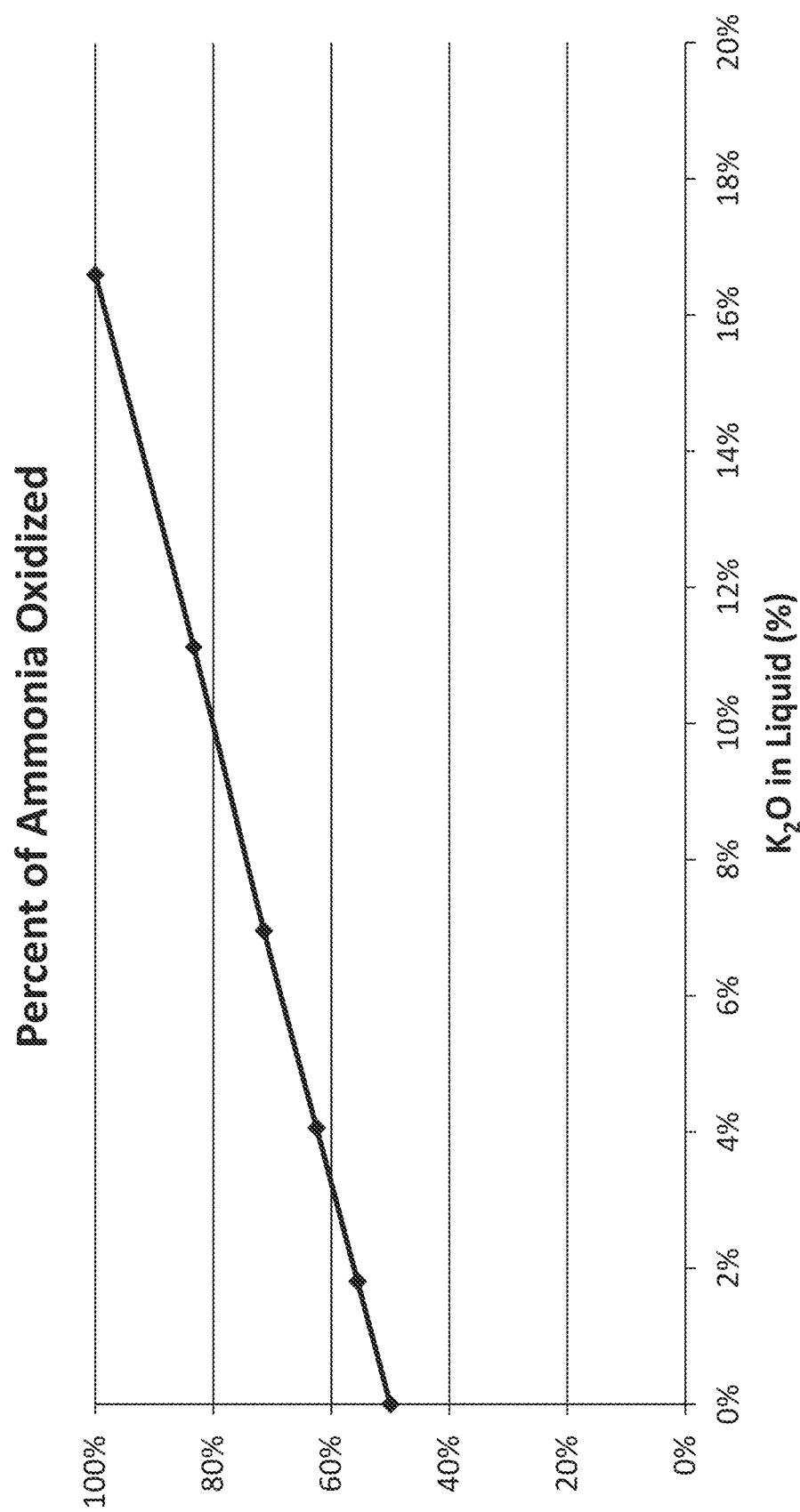

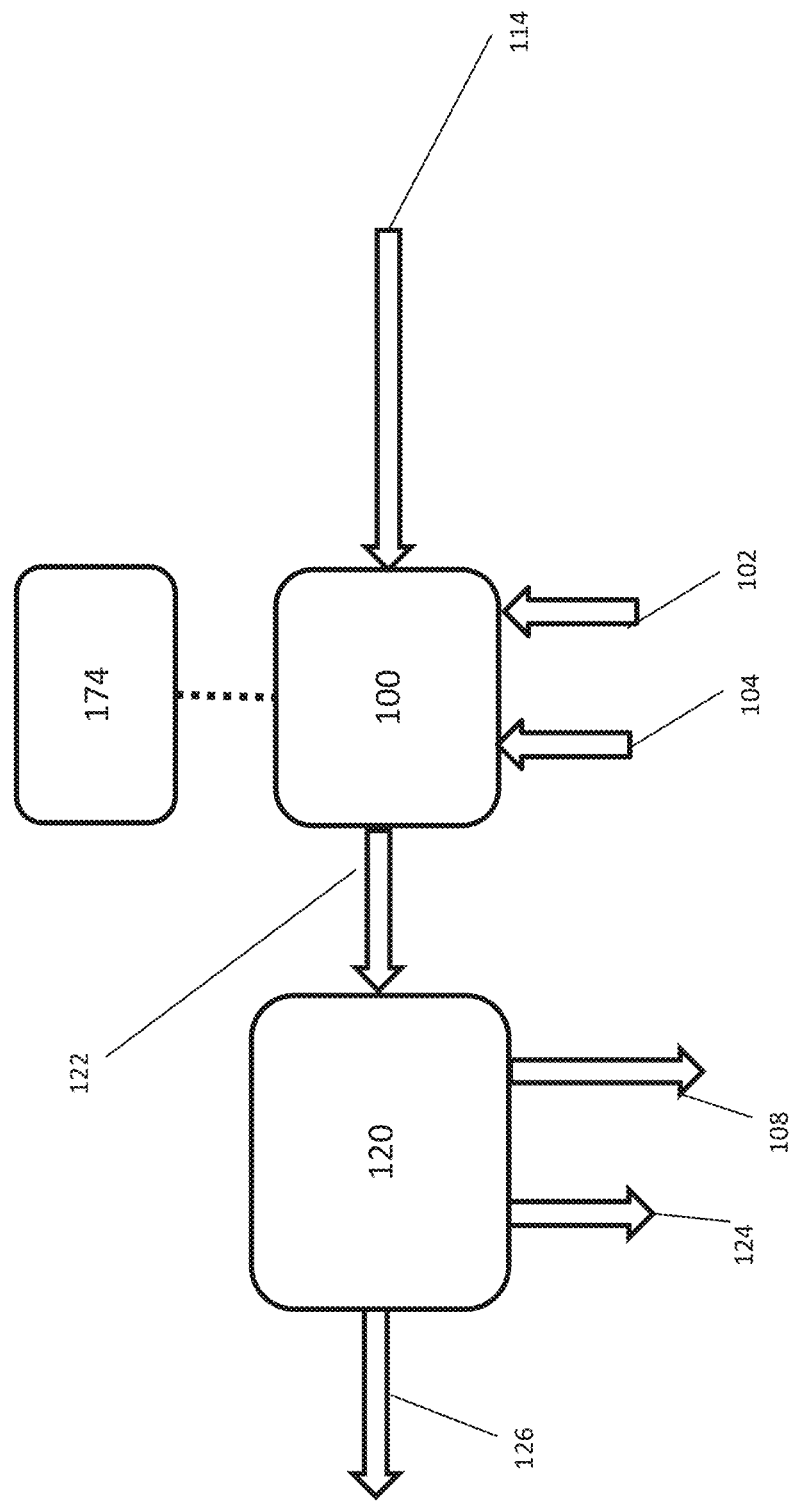

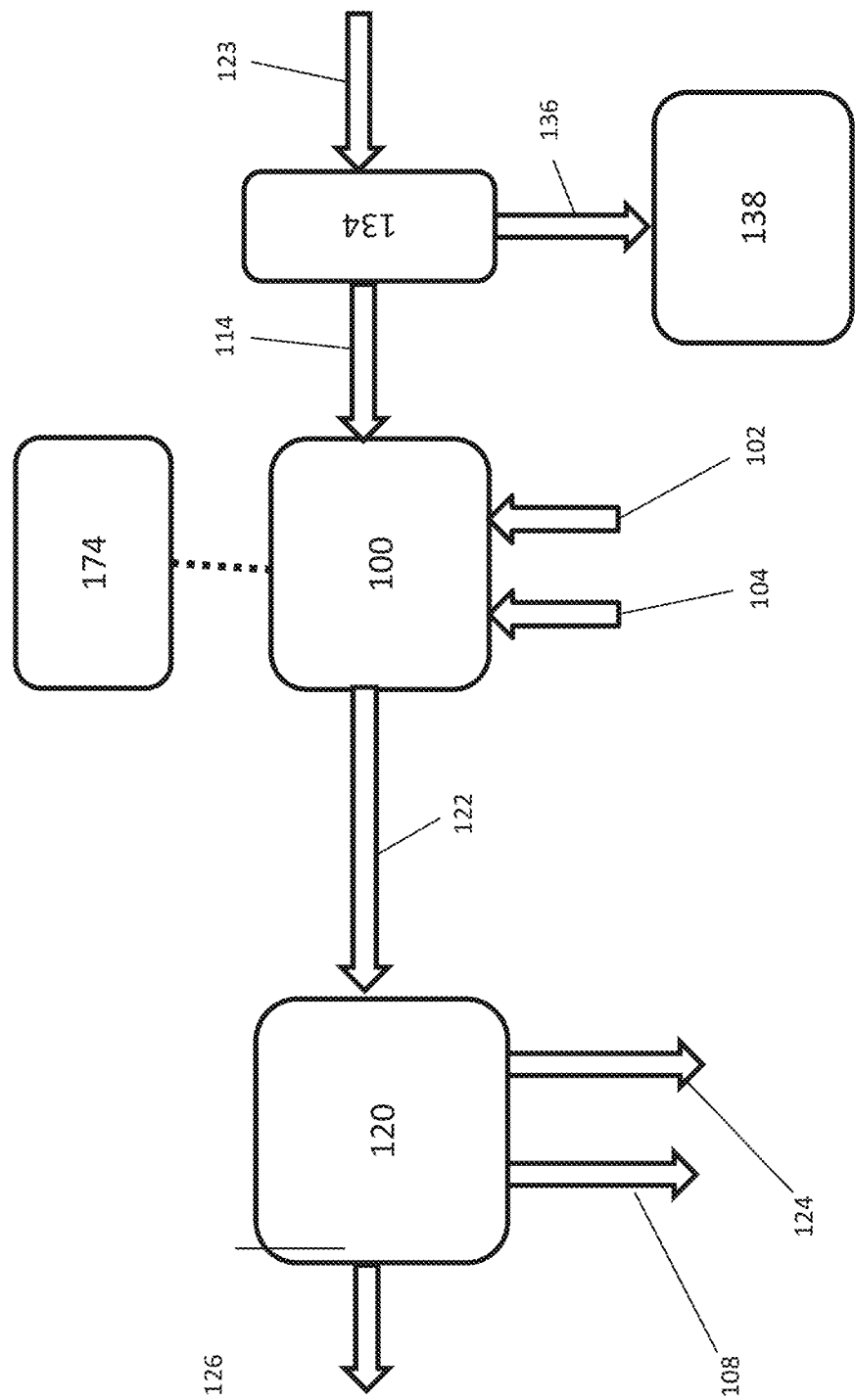

SYSTEM AND METHOD FOR RECOVERING NUTRIENTS FROM A HIGH NITROGENOUS LIQUID WASTE

CROSS-REFERENCE TO RELATED APPLICATIONS

This application is a continuation of U.S. patent application Ser. No. 17/972,524 filed Oct. 24, 2022, which is a continuation of International Patent Application Serial No. PCT/US2021/028984 filed Apr. 23, 2021, which claims priority under 35 U.S.C. § 119(e) to U.S. Provisional Application Ser. No. 63/015,323 titled "SYSTEM AND METHOD FOR RECOVERING NUTRIENTS FROM A HIGH NITROGENOUS LIQUID WASTE" filed on Apr. 24, 2020, each of which is herein incorporated by reference in its entirety.

FIELD OF DISCLOSURE

Aspects and embodiments disclosed herein relate to methods of recovering nutrients from a high nitrogenous waste. More particularly, aspects and embodiments disclosed herein relate to methods of producing a concentrated liquid product having nitrogenous compounds recovered from a high nitrogenous waste.

SUMMARY

In accordance with one aspect, there is provided a method of recovering nutrients from a high nitrogenous waste. The method may comprise collecting the high nitrogenous waste. The method may comprise separating the high nitrogenous waste to produce a solids waste and a liquid waste. The method may comprise introducing the liquid waste and an oxidant into a reactor to produce an intermediate nitrogenous liquid comprising oxy-anions of nitrogen. The method may comprise maintaining the intermediate nitrogenous liquid at a predetermined pH to control a concentration of the oxy-anions of nitrogen and produce a stabilized nitrogenous liquid. The method may comprise concentrating the stabilized nitrogenous liquid to produce a concentrated liquid product and a dilute water.

The method may further comprise introducing a base into the reactor.

In some embodiments, the predetermined pH may be between 3 and 9.

In some embodiments, the predetermined pH may be between 4.0 and 8.5.

In some embodiments, maintaining the intermediate nitrogenous liquid at the predetermined pH comprises at least one of controlling a rate of introduction of the oxidant and controlling a rate of introduction of the liquid waste.

In some embodiments, maintaining the intermediate nitrogenous liquid at the predetermined pH comprises introducing a predetermined amount of a base into the reactor.

The method may further comprise directing the dilute water to an on-site water demand.

In some embodiments, the on-site water demand may be manure flushing, irrigation, or an industrial use.

The method may further comprise directing the solids waste to a composter or an anaerobic digester.

In some embodiments, the method may further comprise maintaining a total dissolved solids concentration of the liquid waste and/or the intermediate nitrogenous liquid between about 1 g/L and about 500 g/L.

In some embodiments, the method may further comprise maintaining a total dissolved solids concentration of the liquid waste and/or the intermediate nitrogenous liquid between about 1 g/L and about 50 g/L.

The method may comprise directing the dilute water to the reactor to maintain the total dissolved solids concentration of the liquid waste and/or the intermediate nitrogenous liquid.

The method may further comprise maintaining a temperature of the liquid waste and/or the intermediate nitrogenous liquid between about 4° C. and about 80° C.

In some embodiments, the oxidant may comprise at least one of oxygen, ozone, a peroxide, and a halogen.

In some embodiments, the oxidant may be liquid oxygen.

In some embodiments, introducing the oxidant into the reactor may comprise aerating the liquid waste in the reactor.

The oxidation may be catalyzed by microorganisms.

In some embodiments, the microorganisms may comprise bacteria and/or archaea.

In some embodiments, concentrating the stabilized nitrogenous liquid comprises directing the stabilized nitrogenous liquid to a membrane based dissolved solids concentrator or an electrochemical separation device.

The method may further comprise separating suspended solids from the stabilized nitrogenous liquid.

In some embodiments, the high nitrogenous waste may comprise at least one of animal manure, animal litter, sewage sludge, food waste, dairy products, organic matter wastewater, and ammonia wastewater.

In some embodiments, the oxy-anions of nitrogen may comprise at least one of nitrite and nitrate.

The method may further comprise pre-treating the high nitrogenous waste to remove phosphorous.

In accordance with another aspect, there is provided a method of recovering nutrients from a nitrogenous liquid waste having dissolved organic matter. The method may comprise collecting the nitrogenous liquid waste having dissolved organic matter. The method may comprise introducing the nitrogenous liquid waste having dissolved organic matter and an oxidant into a reactor to produce an intermediate nitrogenous liquid comprising oxy-anions of nitrogen. The method may comprise maintaining the intermediate nitrogenous liquid at a predetermined pH to control a concentration of the oxy-anions of nitrogen and produce a stabilized nitrogenous liquid. The method may comprise concentrating the stabilized nitrogenous liquid to produce a concentrated liquid product and a dilute water.

In some embodiments, maintaining the intermediate nitrogenous liquid at the predetermined pH comprises at least one of controlling a rate of introduction of the oxidant and controlling a rate of introduction of the nitrogenous liquid waste having dissolved organic matter.

In some embodiments, the predetermined pH is between 3 and 9.

In accordance with another aspect, there is provided a method of recovering nutrients from an ammonia distillate. The method may comprise introducing the ammonia distillate and an oxidant into a reactor to produce an intermediate nitrogenous liquid comprising oxy-anions of nitrogen. The method may comprise maintaining the intermediate nitrogenous liquid at a predetermined pH to control a concentration of the oxy-anions of nitrogen and produce a stabilized nitrogenous liquid. The method may comprise concentrating the stabilized nitrogenous liquid to produce a concentrated liquid product and a dilute water.

In some embodiments, maintaining the intermediate nitrogenous liquid at the predetermined pH comprises at least one of controlling a rate of introduction of the oxidant and controlling a rate of introduction of the ammonia distillate.

In some embodiments, the predetermined pH is between 3 and 9.

In accordance with another aspect, there is provided a system for recovering nutrients from a high nitrogenous waste. The system may comprise a solids-liquid separator having an inlet fluidly connected to a source of the high nitrogenous waste, a solids outlet, and a liquid waste outlet. The system may comprise a reactor having a first inlet fluidly connected to the liquid waste outlet, a second inlet fluidly connected to a source of an oxidant, and a stabilized nitrogenous liquid outlet. The system may comprise a pH control subsystem configured to maintain a predetermined pH within the reactor. The system may comprise a dissolved solids concentrator having an inlet fluidly connected to the stabilized nitrogenous liquid outlet, a concentrated liquid product outlet, and a dilute water outlet.

In some embodiments, the reactor may have a third inlet fluidly connected to a source of a pH adjuster.

The source of the pH adjuster may be a base.

In some embodiments, the pH control subsystem may comprise at least one flow controller configured to control flow rate of the liquid waste or the source of the oxidant.

In some embodiments, the solids-liquid separator may be a centrifuge.

The system may further comprise a composter or an anaerobic digester having an inlet fluidly connected to the solids outlet.

In some embodiments, the dilute water outlet may be fluidly connectable to an on-site water demand.

The system may further comprise a second solids-liquid separator having an inlet fluidly connected to the fluidly connected to the stabilized nitrogenous liquid outlet and a liquid outlet fluidly connected to the dissolved solids concentrator.

In some embodiments, the second solids-liquid separator may be selected from a sedimentation unit, a microfiltration unit, and an ultrafiltration unit.

The second solids-liquid separator may have a solids outlet fluidly connected to a fourth inlet of the reactor.

The system may further comprise a temperature control subsystem configured to maintain a predetermined temperature within the reactor.

The temperature control subsystem may comprise a heat exchanger.

In some embodiments, the system may further comprise a pre-treatment unit positioned upstream from the reactor.

In some embodiments, the dilute water outlet is fluidly connected to a fifth inlet of the reactor.

The pre-treatment unit may comprise a biological phosphorus removal unit.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is a graph of nitrogen and potassium composition controlled by ammonia oxidation;

FIG. 1C is a graph of ammonia oxidation as a function of $K_2O$ concentration in liquid;

FIG. 2 is a box diagram of a system for recovering nutrients from a nitrogenous liquid, according to one embodiment;

FIG. 3 is a box diagram of an alternate system for recovering nutrients from a nitrogenous liquid, according to one embodiment;

DETAILED DESCRIPTION

Figure 1B:
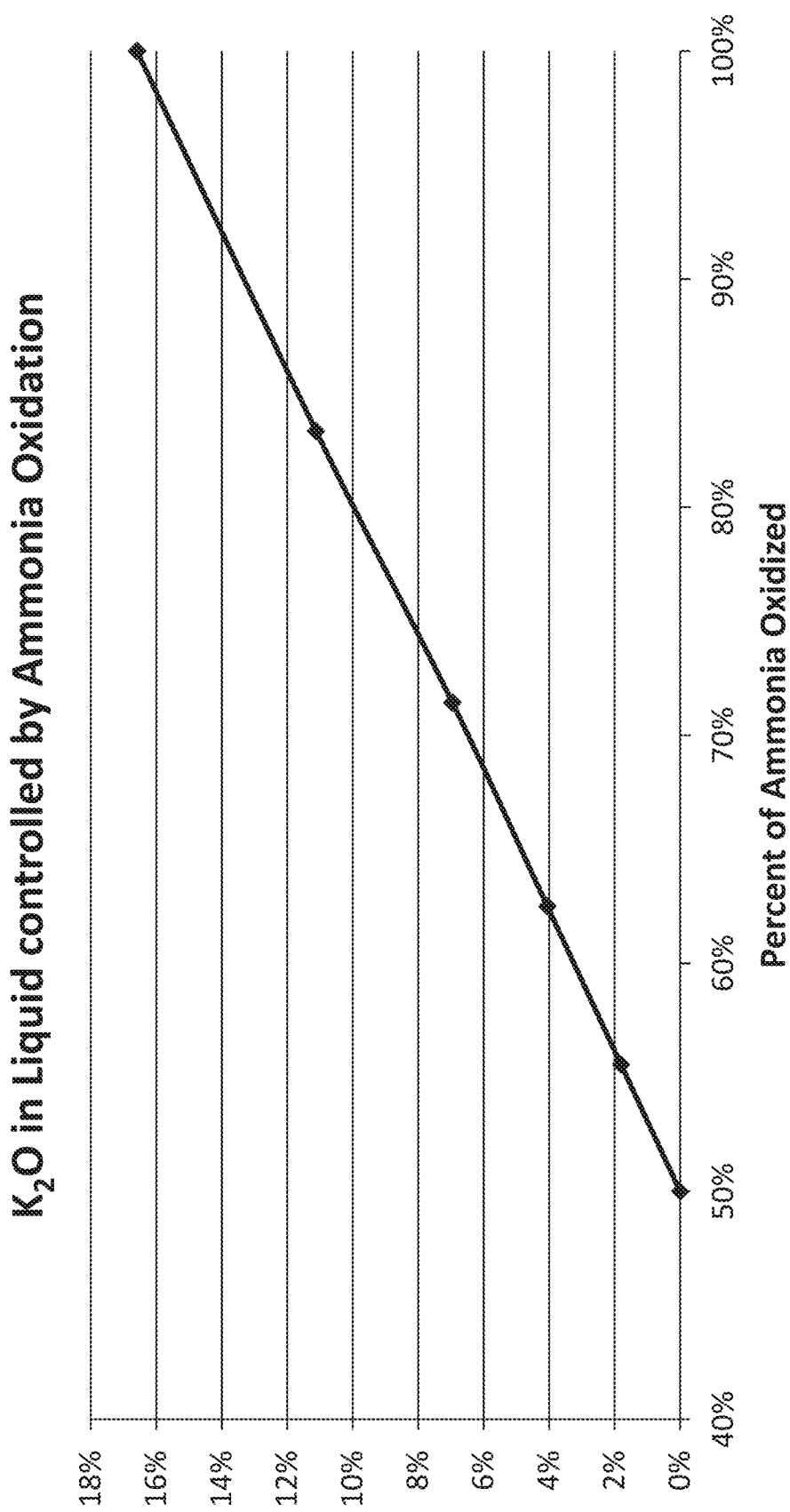
FIG. 1B is a graph of $K_2O$ in liquid controlled by ammonia oxidation.

Management of the nitrogen cycle has been identified by the National Academy of Engineers of the United States as one of the fourteen Grand Challenges of Engineering in the 21st Century. The nitrogen cycle has been disrupted over the last century by human intervention with the synthesis of reactive nitrogen species for fertilizer production and the combustion of fossil fuels. Nitrogen plays an essential role in the production of food for humanity as it is usually the limiting nutrient for crop productivity. It is hypothesized that the existing or future population of the world could not be sustained without producing ammonia from synthetic fertilizers. The methods currently used to meet worldwide food challenges, however, have led to excess nitrogen in the planetary environment which has generated daunting impacts around the world. Excess nitrogen in the environment may play a role in disruption of ecosystems by the eutrophication of waters like the Gulf of Mexico or Chesapeake Bay, exacerbation of global warming by production of potent greenhouse gases, acidification of lakes and soils, and contribution to the disruption of the ozone layer. Promotion of smog in densely populated areas and contamination of drinking water caused by excess environmental nitrogen may have a direct impact on human health. The combined impacts of nitrogen cycle disruption for the United States are an estimated $210 billion a year.

It is hypothesized that agriculture is responsible of over 50% of all reactive nitrogen inputs to the US. Non-point sources of ammonia pollution, such as those associated with agriculture, are prevalent in the US. Due to the gaseous nature of ammonia and its abundance in animal manures, a large volume of ammonia is released to the atmosphere or leached out to surface and/or groundwater during manure processing and land application of manure. Recovery of ammonia to produce fertilizers may reduce input to the atmosphere and offset demands for synthetic nitrogen production.

Ammonia typically acts as a base when dissolved in water. Certain concentrations of ammonia may raise pH of the liquid to a value effective to release free ammonia into to the atmosphere. Free ammonia is often released during storage and land application of liquid manure. Ammonia emissions from manure are a concern for the environment and well-being of humans. Additionally, ammonia emissions from manure are a concern for the health and well-being of farm animals, as ammonia gas is pungent and toxic.

To control or reduce ammonia emissions from liquid substances pH may be controlled to maintain ammonia in a dissolved form. Conventional methods may require the addition of an acid to control pH and stabilize ammonia. However, such methods of pH control for liquid manure applications are challenging due to the high concentration of ammonia and the expense and unintended effects of adding an acid to the liquid.

Additionally, even though ammonia concentration in animal manure is high enough to produce free ammonia emissions, manure as a fertilizer is considered a dilute product. Transportation and application of the dilute product contribute to the high costs associated with animal manure fertilizer. The cost-effective area for application of the manure fertilizer is small, generally limited to a few miles from the farm. As a result, animal manure is usually employed as a fertilizer to saturate local soils.

Thus, it is often desirable to remove water from the liquid manure and produce a concentrated stable nutrient rich liquid product. Concentration may be performed with technologies such as reverse osmosis, forward osmosis, evaporation, among others. When concentrating manure using reverse osmosis, nanofiltration, or evaporation, ammonia may be lost due to the volatile nature of free ammonia. Acidification of the liquid to transform free ammonia into ammonium ion may reduce losses. Without acidification, the relatively high pH associated with the increased concentration of ammonia in solution may induce precipitation of ions such as phosphate, calcium, magnesium, and sulfate, forming incrustations (such as, for example, struvite, calcite, brushite, vivianite, gypsum and others) that foul membranes, pipes, valves, and pumps. Furthermore, membrane fouling of ultrafiltration, nanofiltration, electrodialysis, and reverse osmosis membranes may also occur as a result of the high concentration of easily degradable organic matter that induces biofouling.

The above problems are more prevalent in liquid wastes that have a high concentration of total nitrogen, measured as Total Kjeldahl Nitrogen (TKN). Examples of high TKN liquid wastes include liquids and slurries such as animal manure, e.g., urine and solids, liquid slaughterhouse waste, leachate from decomposing organic materials, waste activated sludge or primary sludge, or digestates of such liquids, such as when such liquids have been treated by anaerobic digestion, optionally in an acid step of anaerobic digestion. Briefly, in the anaerobic digestion process or in the acid step of anaerobic digestion, the organic nitrogen is mostly converted into ammonia. Digestate liquids include waste activated sludge, waste primary sludge, digestates of animal manure, digestates of food waste, or general digestates of organic slurries or solid or slurry organic materials.

The manure high nitrogenous liquid wastes disclosed herein may be formed by passing raw animal manure, e.g., urine and solids, through a solid-liquid separator, such as a filter, centrifuge, hydrocyclone, decanter, or other separator to produce a first stream enriched in solids and a mostly liquid second stream. The mostly liquid stream may form the high nitrogenous liquid waste. The digestate high nitrogenous liquid waste disclosed herein may be raw digestate or digestate that has been further processed for separation of solids, as previously described. Such high nitrogenous liquid wastes may be stabilized and concentrated by the methods and systems disclosed herein. The methods and systems disclosed herein are practical and cost effective, reduce environmental impact, improve animal health by alleviating diseases and conditions associated with uncontrolled ammonia emissions, and recover a valuable resource producing a fertilizer that can be safely stored and accurately applied.

In accordance with one or more embodiments, the nitrogenous compounds, including urea, uric acid, proteins, and ammonia, can be recovered from a stabilized liquid and converted into usable fertilizers for reuse in the agricultural production of food. The recovery and reuse of nitrogen may reduce ammonia emissions to the environment and contributes to a more sustainable food supply chain. Systems and methods disclosed herein may be employed to produce a fertilizer liquid that has a selected proportion of anions and cations in solution for agricultural use. In some embodiments, the oxidation of ammonia for acid production may be chemical in nature while in other embodiments the oxidation of nitrogenous compounds to produce scrubbing acid may be biological.

The methods disclosed herein involve partial oxidation of nitrogenous compounds, such as ammonia, to form oxy-anions of nitrogen, such as nitrite or nitrate. In particular, the methods allow the conversion of a fraction of nitrogenous compounds to oxy-anions of nitrogen. The conversion may be effective to reduce pH of the liquid, stabilizing the ammonia and reducing ammonia emissions from free ammonia. In certain embodiments, the methods disclosed herein may effectively reduce pH of the liquid without addition of an external acid. The oxy-anions of nitrogen may be generated by an oxidation reaction of ammonia in solution with an oxidizing agent, such as oxygen, peroxide, or ozone. The rate of oxidation may be controlled to a desirable extent.

The oxidation of ammonia to produce oxy-anions reduces the pH of the solution. Effective control of pH may be required to achieve a rate of oxidation useful in practice. In certain embodiments, an external base may be used to control pH of the solution. The extent of ammonia oxidation to produce oxy-anions of nitrogen such as nitrite or nitrate can be controlled by controlling a rate of addition of the nitrogenous liquid or the oxidant. Additionally, adding more or less base to keep pH of the solution at a desirable level may further control the oxidation reaction.

In certain instances, the oxidation reaction may be inhibited by a high concentration of dissolved ions in solution. Dilution water may be combined with the liquid to reduce inhibition of oxidation. In such embodiments when dilution water is used, the liquid product may be concentrated by removing water to produce a concentrated liquid product.

The graph of FIG. 1A shows pH control of the nitrogenous liquid with potassium base as an example. The percentage of the ammonia captured that is oxidized may be controlled by adding different amounts of a base, such as the potassium base. As shown in FIG. 1A, when there is no addition of base, the oxidation of ammonia is controlled to about 50%. By adding the base, increasing amounts of ammonia up to 100% may be oxidized and converted to oxy-anions of nitrogen.

The following chemical reactions, which take place in one or more of the embodiments disclosed herein, illustrate the combination of an oxidant, ammonia, and water to produce ammonium salts in solution. Some of the reactions are physical and involve material transfer, while others are chemical in nature, like water ionization. In at least some embodiments, some reactions may be mediated by naturally present microorganisms in the liquid. In some embodiments the reactions of nitrogenous liquids with water and the oxidant may take place in one chamber. In other embodiments, the reactions may take place in separate chambers.

$$NH_3(gas) + H_2O(liquid) \leftrightarrow NH_3(aqueous) + H_2O \qquad (1)$$

$$NH_3(aqueous) + 2H_2O(liquid) \leftrightarrow NH_4^+ + OH^- \qquad (2)$$

$$NH_3(aqueous) + O_2(aqueous) \rightarrow NO_2^- + H^+ \qquad (3)$$

$$NH_3(aqueous) + \frac{3}{2}O_2(aqueous) \rightarrow NO_3^- + H^+ \qquad (4)$$

$$NH_3(aqueous) + \frac{2}{3}O_3(aqueous) \rightarrow NO_2^- + H^+ \qquad (5)$$

$$NH_3(aqueous) + O_3(aqueous) \rightarrow NO_3^- + H^+ \qquad (6)$$

$$KOH + H_2O \rightarrow K^+ + OH^- + H_2O \qquad (7)$$

Equation (1) illustrates the release of free ammonia from solution into the atmosphere as ammonia gas. This reaction is the normal fate of ammonia in high nitrogenous liquid waste which is responsible for loses of ammonia from the liquid and impacts of ammonia on the environment. Equation (2) shows the acid-base reaction of free ammonia dissolved in liquid to form ammonium cation. The extent of the ionization between ammonia and ammonium-cation may generally depend on the pH of the solution. Ammonia in solution reacts with an oxidant for example, ozone or oxygen, as shown in equations (3) through (6) to form oxy-anions of nitrogen depending on the pH of the solution and other chemical species in the background chemical matrix. Under such a reaction, the net effect is that a cation (ammonium ion) is consumed and an anion (nitrite or nitrate) is produced with a loss of two proton equivalents. The reaction may lower the pH if no base is added. Thus, pH may be controlled by limiting the extent of the ammonia oxidation and using the ammonia in the nitrogenous liquid waste as the base. The pH may further be controlled by adding an external base.

In some embodiments, a base may be added. Equation (7) illustrates the effect of the addition of an exemplary base, potassium. Other bases may be used depending on the desired composition of the final product. The reactions may produce a solution that contains ammonium ions, nitrogen oxy-anions, cations which originate from the added base, and background cations and anions. A concentrated solution of nitrogen may be recovered as a byproduct in some embodiments. For example, a 1,000 to 170,000 mg/L concentrated solution of nitrogen may be recovered, with a fraction of ammonia oxidation selected, for example, from 30% to 100%. The ratio of ammonium to oxy-anions may be controlled by controlling pH and/or the addition of the external base.

The reactions generally induce oxidation of other reduced compounds present in the high nitrogenous liquid. Examples of such compounds include reduced sulfur compounds, organic acids and other organic compounds, reduced iron and manganese. The compounds generally include substances measured as part of the biochemical oxygen demand test, BOD. The oxidation reactions may further serve to stabilize the waste to a form suitable for storage, for example, emitting low odor.

In accordance with an aspect, there is provided a method of recovering nutrients from a high nitrogenous waste. The method may comprise collecting the high nitrogenous waste.

The high nitrogenous waste may be an organic waste. For example, the high nitrogenous waste may comprise at least one of animal manure or animal litter. The animal manure or animal litter may comprise, for example, urine and/or solids. The high nitrogenous waste may comprise sewage sludge. The high nitrogenous waste may comprise food waste. The high nitrogenous waste may comprise dairy products. In exemplary embodiments, the high nitrogenous waste may comprise animal manure, for example, urine and/or solids, for example, swine manure, poultry manure, cow manure, or other livestock manure.

In some embodiments, the high nitrogenous waste may comprise organic matter, an organic matter wastewater, and/or partially treated organic matter. For instance, the high nitrogenous waste may comprise enzymatically hydrolyzed organic waste, organic waste digestate, e.g., digestate from the acid digestion step of organic matter. The high nitrogenous waste may comprise digestates, condensates, and/or leachates of organic matter or an organic matter wastewater.

In certain embodiments, the high nitrogenous waste may be a liquid waste having dissolved organic matter. The dissolved organic matter may be an aqueous solution associated with any source of organic matter, such as, animal manure, animal litter, sewage sludge, food waste, dairy products, organic matter wastewater, and/or a partially treated organic matter, as previously described. In certain exemplary embodiments, the liquid waste having dissolved organic matter is effluent from a high rate anaerobic digester. In certain exemplary embodiments, the liquid waste having dissolved organic matter is not associated with a drying process of organic matter.

In some embodiments, the high nitrogenous waste may comprise an ammonia wastewater. The ammonia wastewater may comprise ammonia condensate formed by condensing ammonia from a gas into a liquid, ammonia distillate, aqua ammonia, and/or ammonia stillage. The ammonia distillate may comprise digestates, condensates, and/or leachates of ammonia distillate.

In certain exemplary embodiments, the nitrogenous waste may comprise an ammonia distillate. The ammonia distillate may comprise an aqueous solution separated from a nitrogenous liquid source by distillation. In certain embodiments, the nitrogenous liquid source is an ammonia or ammonium containing liquid. In certain embodiments, the nitrogenous liquid source is an organic matter containing liquid.

The nitrogenous compounds, for example ammonia and other nitrogen-containing species, may be recovered from the nitrogenous waste to produce an organic product or a bioproduct suitable for organic farming. In some embodiments, the nitrogenous compounds are recovered to produce fertilizer. The fertilizer may be a liquid fertilizer comprising nitrogenous compounds. In some embodiments the fertilizer may comprise ammonium crystals or nitrate crystals. In embodiments, for example, where the nitrogenous waste is produced from organic material, fertilizer produced by such methods as described herein may be organic fertilizer, for example, for use on organic farms.

Methods and systems disclosed herein may produce an organic product, for example, a certified product suitable for organic farming. Certification may be dependent on the quality of the starting material. In some embodiments, the starting material (i.e. nitrogenous waste, oxidant, and optional base) is compliant with organic certification, and produces a certified organic product. Specifically, such fertilizer products produced by the disclosed methods may not require artificially added materials. Fertilizer products produced by the disclosed methods may comply with requirements outlined by the Organic Materials Review Institute (OMRI). In some embodiments, methods and systems disclosed herein may produce a fertilizer product comprising at least 16% nitrogen by mass.

The high nitrogenous waste may be characterized by a high concentration of nitrogenous species, e.g., total nitrogen. In certain embodiments, the high nitrogenous waste may comprise high concentrations of total nitrogen, measured as Total Kjeldahl Nitrogen (TKN). The high nitrogenous waste may comprise about 1,000-12,000 mg/L N, for example, 1,000-3,000 mg/L; 3,000-5,000 mg/L; 5,000-10,000 mg/L; or 10,000-12,000 mg/L N. In certain embodiments, the high nitrogenous waste may comprise about 100,000-300,000 mg/L N, for example, 200,000-300,000 mg/L N.

The high nitrogenous waste may be substantially liquid. In some embodiments, the high nitrogenous waste may have less than 10% solids, for example, 1%-10% solids, 1%-8% solids, 1%-6% solids, 1%-4% solids, or 1%-2% solids. Exemplary liquid nitrogenous wastes include flushing pit wastes, e.g., animal manure flushing pit wastes, sewage sludge, organic matter wastewaters, and partially treated organic matter, such as organic waste digestates, condensates, and/or leachates. In exemplary embodiments, the animal manure flushing pit waste may comprise swine manure. In certain embodiments, the liquid nitrogenous waste may be a liquid waste having dissolved organic matter.

The high nitrogenous waste may have more than 6% solids, for example, 6%-10% solids, 10%-15% solids, 15%-20% solids, 20%-25% solids, 25%-30% solids, or 30%-35% solids. Exemplary high solids nitrogenous wastes include animal manure and animal litter. In exemplary embodiments, the animal manure and animal litter waste may comprise poultry manure.

In some embodiments, the methods may comprise separating the high nitrogenous waste to produce a solids waste and a liquid waste. The liquid waste may comprise less than about 1% solids or about 1%-2% solids. For example, the liquid waste may comprise less than about 1%, about 1%, about 1.5%, or about 2% solids. In certain embodiments, for example, for high nitrogenous wastes having less than about 1% or about 1%-2% solids, the high nitrogenous waste may be referred to as a liquid waste. The solids waste may have about 15%-35% solids, for example 20%-30% solids.

The methods may comprise composting or digesting the solids waste. The methods may comprise directing the solids waste to a composter or digester. During composting, aerobic microorganisms break down organic matter into compost. During anaerobic digestion, anaerobic microorganisms convert biologically degradable material in the solids primarily into water and biogas. In particular, anaerobic microorganisms facilitate decomposition of macromolecular organic matter in the solids into simpler compounds and biogas by methane fermentation. Such biogas is primarily carbon dioxide and methane but may include other constituents depending on the composition of the wastewater.

In some embodiments, the methods may comprise removing phosphorus from the high nitrogenous waste and/or the liquid waste. Phosphorus may be removed by a biological phosphorus removal process. The methods may comprise directing the high nitrogenous waste and/or the liquid waste to a phosphorus removal process. The methods may comprise removing phosphorus from the high nitrogenous waste and/or the liquid waste to reduce toxicity of the liquid for any oxidation catalyzing microorganisms. In embodiments in which the high nitrogenous waste comprises harmful compounds, the methods may comprise removing at least some of the harmful compounds to maintain viability of the microorganisms.

The methods may comprise oxidizing the liquid waste to produce oxy-anions of nitrogen. In particular, the methods may comprise contacting the liquid waste with an oxidant, for example, by introducing the liquid waste and an oxidant into a reactor. The partially oxidized liquid waste may be referred to as an intermediate nitrogenous liquid. Thus, the intermediate nitrogenous liquid may comprise the liquid waste and oxy-anions of nitrogen. The oxy-anions of nitrogen may include, for example, at least one of nitrite and nitrate.

The oxidant may be introduced to oxidize a predetermined amount of the nitrogenous compounds to nitrogen ions. The oxidant may comprise oxygen, ozone, a peroxide, such as hydrogen peroxide, or a halogen. In some embodiments, introducing an oxidant comprises contacting the liquid waste with air. Aqueous ammonia may partially oxidize to produce nitrate and nitrite according to equations (3) through (6) above. Oxidation to nitrogen ions will generally lower the pH of the solution by exchanging a weak acid for a strong acid. Controlling oxidation conditions may also provide for a more stable product, for example, by inhibiting the formation of odorous and corrosive compounds in the final product. Controlling dissolved solid concentrations and oxidation reactions may provide for operation in pH ranges that favor operational and capital costs of investment.

The oxidation reactions may be inhibited by a high concentration of dissolved ions in solution. In certain embodiments, dilution water may be added to reduce inhibition. For example, makeup water may be added to replace liquid lost in the process and/or to dilute the liquid waste to avoid inhibition effects on the rate of oxidation. The dilution water may be recirculated from a downstream process to reduce environmental impact of the process. When dilution water is added, the product may later be concentrated using several alternative means of removing water from the solution to produce a concentrated liquid fertilizer.

As disclosed herein, oxidation may comprise partial oxidation and need not be a complete conversion of ammonia to ionic species. For example, oxidation may be controlled to oxidize between about 5%-80% of the nitrogenous compounds, for example, by controlling supply of the oxidant to the liquid solution. Oxidation may be controlled to between about 5%-40%, 5%-30%, 5%-20%, 5%-15%, 5%-10%, 10%-15%, 10%-20%, 10%-30%, 10%-40%, 10%-50%, 10%-80%, 50%-60%, 50%-70%, or 50%-80%. Oxidation may be controlled to less than 5%, less than 10%, less than 15%, less than 20%, less than 25% conversion, less than 30% conversion, less than 35% conversion, less than 40% conversion, less than 45% conversion, less than 50% conversion, less than 55% conversion, less than 60% conversion, less than 65% conversion, less than 70% conversion, less than 75% conversion, or less than 80% conversion. The extent of conversion may be controlled as required by design of the final fertilizer product. In some embodiments, a fraction of the liquid waste is oxidized.

Thus, the methods may comprise controlling a rate of oxidation of the liquid waste. In certain embodiments, the rate of oxidation may be controlled by controlling pH of the liquid. The methods may comprise maintaining the intermediate nitrogenous liquid at a predetermined pH to control a concentration of the oxy-anions of nitrogen and produce a stabilized nitrogenous liquid. The methods may comprise selecting the predetermined pH. The predetermined pH may be selected to correspond with a desired rate of oxidation. For example, the predetermined pH may be selected to control composition of the liquid product and produce a liquid product having a desired composition. The predetermined pH may be between about 3 and about 9, for example, between about 4.0 and about 8.5, for example, between about 5.5 and about 8.5. In exemplary embodiments, a predetermined pH between about 4.5 and about 8.5 may correspond with 5% to about 80% oxidation of nitrogenous compounds in the liquid waste.

In some embodiments, the methods may comprise measuring pH of the intermediate nitrogenous liquid. The methods may comprise adjusting pH of the intermediate nitrogenous liquid responsive to the measurement. In some embodiments, methods disclosed herein may comprise maintaining a pH of the intermediate nitrogenous liquid above 3, above 4, above 5, above 6, above 7, or above 8. Methods may comprise maintaining a pH of the intermediate nitrogenous liquid below 9, below 8, below 7, below 6, below 5, or below 3. In some embodiments, the predetermined pH is about 3, about 4, about 4.5, about 4.7, about 5, about 5.5, about 5.7, about 6, about 6.7, about 7, about 7.3, about 7.5, about 8, about 8.5, or about 9.

In some embodiments, fluctuations in pH may arise responsive to varying properties of the liquid waste. In practice, maintaining a pH of the liquid may comprise controlling pH to a value within tolerance from the predetermined pH value. Tolerance may be ±1% of the predetermined pH, ±2% of the predetermined pH, ±5% of the predetermined pH, or ±10% of the predetermined pH value. In other embodiments, maintaining pH of the liquid may comprise controlling pH to the predetermined pH value.

The predetermined pH and/or desired rate of oxidation may be selected to control composition of the liquid product. The liquid product may comprise ammonia and oxy-anions of nitrogen. The predetermined pH may generally correlate with the desired conversion of nitrogenous compounds to oxy-anions, i.e. with the desired concentration of oxy-anions of nitrogen in the nitrogenous liquid. The composition of the liquid product may comprise 20%-100% oxidation of ammonia to oxy-anions of nitrogen. For example, the composition of the liquid product may be selected to have less than 50% oxidized ammonia. The composition of the liquid product may be selected to have 50%-100% oxidized ammonia. Generally, a greater pH (closer to 9) may correspond with a lesser rate of oxidation (closer to 20% oxidation). A lesser pH (closer to 5) may correspond with a greater rate of oxidation (closer to 100%).

In some embodiments, maintaining the intermediate nitrogenous liquid at the predetermined pH and/or adjusting pH of the intermediate nitrogenous liquid comprises at least one of controlling a rate of introduction of the oxidant and controlling a rate of introduction of the liquid waste into the reactor. For example, flow rate of the of the oxidant may be controlled. Flow rate of the liquid waste may be controlled. Generally, a greater flow rate of the oxidant and/or a lesser flow rate of the liquid waste may correspond with a lesser pH and greater rate of oxidation (closer to 100% oxidation). A lesser flow rate of the oxidant and/or a greater flow rate of the liquid waste may correspond with a greater pH and a lesser rate of oxidation (closer to 20%).

In some embodiments, the method may comprise introducing a base into the liquid waste or intermediate nitrogenous liquid. Thus, the method may further comprise introducing a base into the reactor. Maintaining the intermediate nitrogenous liquid at the predetermined pH comprises introducing a predetermined amount of a base into the reactor.

The base may be a weak or strong base, as required to control oxidation or pH of the process solutions. The base may be a salt of a base, for example, as shown in equation (7), above. Generally, oxidation of the nitrogenous compounds to oxy-anions of nitrogen may be controlled up to 50% conversion without externally adding a base. As shown in FIGS. 1A-1C, potassium base, such as potassium hydroxide, may be added to control pH of the intermediate nitrogenous liquid. The percentage of the ammonia oxidized from the nitrogenous waste may be controlled by adding different amounts of the potassium base. When there is no addition of potassium base, the oxidation of ammonia is controlled to 50%. By adding the potassium base, increasing amounts of ammonia may be oxidized up to 100% and converted to oxy-anions of nitrogen. The amount of base added may be selected to correlate with a desired percent conversion of ammonia to oxy-anions, as shown in FIG. 1C. For example, in some embodiments, base addition as 2% potassium oxide ($K_2O$) may convert 56% of the ammonia, as 4% $K_2O$ may convert 63% of the ammonia, as 7% $K_2O$ may convert 71% of the ammonia, as 11% $K_2O$ may convert 83% of the ammonia, and as 17% $K_2O$ may convert 100% of the ammonia.

Thus, the methods may comprise oxidizing between about 50% and about 100% of the nitrogenous compounds by addition of varying amounts of a base. In some embodiments the base may comprise potassium, for example potassium hydroxide or potassium dioxide. The base may comprise any one or more of lithium, sodium, potassium, rubidium, cesium, magnesium, calcium, strontium, and barium. The base may comprise or be associated with a weak base element, for example, ammonia, carbon, nitrogen, oxygen, fluoride, phosphorus, sulfur, chloride, bromide, and iodine.

In some embodiments, the base may be prepared by introducing a salt into water to produce a salt solution. Ions in the salt solution may be electrically separated, for example in an electrodialysis process, to produce a cation stream and an anion stream. The cation stream may be employed as the base, such that the cation stream may be introduced into the liquid waste or intermediate nitrogenous liquid as needed. The anion stream may be employed in a separate process to produce a treated gas and nitrogenous liquid from a nitrogenous gas, as conventionally practiced. The specific salt may be selected to control composition of the final fertilizer product.

The oxidation may be catalyzed by microorganisms. In some embodiments, methods may comprise dosing the nitrogenous waste or liquid waste with a biological catalyst. In accordance with certain embodiments, a naturally occurring microbial culture may be employed to enhance the oxidation of nitrogenous compounds. Process liquids may be dosed with biological catalyst, for example a microbial or enzymatic organism. The microbial or enzymatic organism may comprise bacteria and/or archaea. The microbial or enzymatic organism may generally be a nitrifying organism.

Catalysis may be accomplished by retaining the biological organisms catalyzing the oxidation in the reaction tank where the oxidant, e.g., oxygen, is supplied. The pH may be controlled between about 4 and 8.5, for example, between about 4.5 and 8.1, depending on the viability of the biological organisms, to allow growth, proliferation, and catalysis of the biological organisms. For instance, it has been found that certain nitrifying microorganisms are capable of growth, proliferation, and catalysis at pH levels as low as 4.0. In certain embodiments, the microorganisms may grow in suspension within the reactor. In some embodiments, the microorganisms may grow attached to surfaces forming a biofilm. In some embodiments, the microorganisms may grow in a combination of suspended growth and biofilm growth. The biofilm may be static in the reactor or moving.

The oxidation reaction may be performed in one or several reactors. For instance, microorganisms may be positioned in a first reactor from a plurality of oxidation reactors in series. Microorganisms may be positioned in a second or subsequent reactor from a plurality of oxidation reactors in series. In certain exemplary embodiments, for example, when oxidation is performed in more than one reactor, excess suspended solids may be rich in phosphorus, creating a segregation of nitrogen and phosphorous streams.

Once the organisms grow and are established in the system, they may be separated out of the final liquid and/or solid product. In accordance with certain embodiments, the separated biological organisms may be returned to the reaction tank to enhance the culture, further speeding the oxidation reaction. Thus, in some embodiments, methods may comprise separating solids from a stabilized liquid or liquid product. The solids may contain the biological organisms and/or crystalized or precipitated components of the product.

The concentration of the final ions in solution may be controlled by employing dilution of process liquids with water. In some embodiments, process liquids may be diluted to preserve viability of the microorganisms. For instance, dilution water may be directed to the reactor to avoid toxicity of the microorganisms. An effective amount of dilution water may be directed to reduce concentration of the toxic creating substance.

In some embodiments, process liquids may be diluted or evaporated to induce formation of crystals. In some embodiments, methods disclosed herein comprise controlling a concentration of total dissolved solids (TDS) in the intermediate nitrogenous liquid. For example, the methods may comprise maintaining a concentration of TDS in the intermediate nitrogenous liquid below about a threshold concentration to avoid the formation of crystals. For example, the concentration of TDS may be maintained below about 35%, 40%, 41%, 42%, 43%, 44%, 45%, 46%, 47%, 48%, 49%, or 50% (m/v). In some embodiments, methods comprise maintaining a concentration of TDS above the threshold concentration to induce formation of crystals. For example, methods may comprise maintaining a concentration of TDS above about 46%, 47%, 48%, 49%, 50%, or 55% (m/v).

The threshold concentration will generally be dependent on the composition of the nitrogenous waste or liquid waste. The oxidant, base, and/or any additional component added may dictate the threshold concentration to avoid formation of crystals. In some embodiments, for example, wherein the nitrogenous waste comprises sulfur species, the threshold concentration may be 46% (m/v).

Exemplary methods disclosed herein may comprise maintaining a concentration of TDS between about 1 g/L and about 500 g/L, for example between about 1 g/L and about 50 g/L. Thus, the methods may comprise measuring TDS of the intermediate nitrogenous liquid. The methods may comprise concentrating or diluting the liquid waste or intermediate nitrogenous liquid responsive to the TDS measurement. In some embodiments, the method comprises collecting the liquid product, the crystals, or both.

The crystals may further be processed as a final product. For example, the crystals may be processed as a solid fertilizer. The solid product may comprise at least 15%, 16%, 17%, 18%, 19%, 20%, 21%, 22%, 23%, 24%, or 25% nitrogen by mass. In some embodiments, the solid product may comprise less than 1% phosphate and potassium. The solid product may be substantially free of phosphate and potassium. For example, the solid product may comprise less than 0.1%, 0.01%, 0.01% or 0.001% phosphate and potassium.

The methods disclosed herein may comprise maintaining a temperature of the liquid waste or intermediate nitrogenous liquid between about 4° C. and about 80° C., for example, between about 10° C. and about 80° C. The methods may comprise measuring temperature of the liquid waste or intermediate nitrogenous liquid. The methods may comprise heating or cooling the liquid responsive to the temperature measurement. The temperature of the process may be controlled to below about 80° C., below about 70° C., below about 60° C., below about 50° C., below about 40° C., below about 30° C., below about 20° C., below about 15° C. In some embodiments, methods may comprise maintaining a temperature of the liquid waste or intermediate nitrogenous liquid at about 4° C., 5° C., 10° C., 15° C., 20° C., 25° C., 30° C., 35° C., 40° C., 45° C., 50° C., 55° C., 60° C., 65° C., 70° C., 75° C., or 80° C., or any range in between. In embodiments in which the oxidation is catalyzed by microorganisms, the methods may comprise controlling temperature of the liquid waste or intermediate nitrogenous liquid to a temperature effective to maintain viability of the microorganisms.

In some embodiments, conductivity of one or more process liquids may be measured. Upon reaching a threshold conductivity, one or more of the process liquids may be diluted to maintain the conductivity within a working range. The value of the threshold conductivity may generally vary with certain parameters. For example, the threshold conductivity may be a factor of the quality of the nitrogenous waste or the composition of the added base, oxidant, and/or salt. The threshold conductivity may be between about 200 μS and about 2000 μS, between about 2000 μS and about 20000 μS, between about 20 thousand μS and about 200 thousand μS, or between about 200 thousand μS and about 1.2 million μS.

The methods disclosed herein may comprise controlling the rate of oxidation of the nitrogenous compounds in the liquid waste to produce a stabilized nitrogenous liquid. The stabilized nitrogenous liquid may be controlled to a predetermined pH range and have a selected fraction of oxidized nitrogenous compounds. The methods may further comprise concentrating the stabilized nitrogenous liquid to produce a concentrated liquid product and a dilute water. Thus, the stabilized nitrogenous liquid may further be processed as a final product. The method may comprise collecting a liquid product comprising at least a fraction of the stabilized nitrogenous liquid, remaining nitrogenous compounds (for example, nitrogenous compounds that have not been oxidized), and the oxy-anions of nitrogen. The liquid product may be processed as a liquid fertilizer, as described in more detail below.

The methods may comprise concentrating the stabilized nitrogenous liquid by removing excess water. Concentrating the stabilized nitrogenous liquid to produce the liquid product may comprise directing the stabilized nitrogenous liquid to a membrane based dissolved solids concentrator and/or an electrochemical separation device. The dissolved solids concentrator may be an evaporation process. The dissolved solids concentrator may be a reverse osmosis process. In some embodiments, the electrochemical separation device may be an electrodialysis process. The electrochemical separation device may be a capacitive deionization process. Other concentration processes may be employed.

In certain embodiments, the methods may comprise concentrating the liquid product to further remove excess water. For instance, the methods may comprise concentrating the stabilized nitrogenous liquid by a first concentration process to produce a liquid product and concentrating the liquid product by a second concentration process to produce a further concentrated liquid product. The first and second concentration processes may be the same unit operation or different unit operations, as described above. In exemplary embodiments, the methods may comprise concentrating the stabilized nitrogenous liquid by a reverse osmosis process to produce a liquid product and concentrating the liquid product by evaporation to produce a further concentrated liquid product.

In some embodiments, the methods may comprise separating suspended solids from the stabilized nitrogenous liquid. Suspended solids may be separated prior to concentrating the stabilized nitrogenous liquid. For instance, the method may comprise directing the stabilized nitrogenous liquid to a solids-liquid separation unit. The method may comprise separating solids from the stabilized nitrogenous liquid to produce a liquid stream being free of solid materials that interfere with the dissolved solids concentrator. The separated solids may be collected or recirculated within the system. For instance, the method may comprise directing the excess solids to the reactor where the high nitrogenous liquid is processed. The solids-liquid separation may comprise one or more of sedimentation, microfiltration, or ultrafiltration.

In certain embodiments, the water removed from the liquid effluent stream may be recirculated back as dilution water to minimize the use of external dilution water. For example, in embodiments where the liquid product is concentrated, the method may comprise returning at least a fraction of the excess water removed from the product to the nitrogenous liquid. The excess water may be returned to control a concentration of components in the liquid waste, for example, oxidant, base, or TDS. The excess water may be returned to control pH of the intermediate nitrogenous liquid, as needed.

In some embodiments, the stabilized nitrogenous liquid or liquid product comprises at least 4% nitrogen by mass. The stabilized liquid or liquid product may comprise at least 4%, 5%, 6%, 7%, 8%, 9%, 10%, 15%, or 20% nitrogen by mass. The quality of the liquid product may be controlled by maintaining a pH between about 3 and about 9, for example maintaining a pH between about 5.5 and 8.5. The pH may generally alter the composition of the solution, by pushing the reaction of equation (2) forwards or backwards or by driving the reactions of equations (2) through (6). Additionally, the quality of the liquid product may be controlled by controlling addition of an oxidant (ORP of the solution), for example, to maintain balance of nitrogenous compounds and oxy-anions of nitrogen in the solution. In some embodiments, the liquid product may comprise less than 1% phosphate and potassium. The liquid product may be substantially free of phosphate and potassium. For example, the liquid product may comprise less than 0.1%, 0.01%, 0.01% or 0.001% phosphate and potassium.

The methods disclosed herein may produce a concentrated liquid product that is 2×-10× concentrated for nitrogenous compounds as compared to the high nitrogenous waste. Thus, the concentrated liquid product may have 50%-10% the volume of the high nitrogenous waste. In certain embodiments, the concentrated liquid product may have less than 20% the volume of the high nitrogenous waste. In certain embodiments, the concentrated liquid product may have less than 10% the volume of the high nitrogenous waste. The concentrated liquid product may be easier to handle, store, and transport than the high nitrogenous waste. The concentrated nitrogenous compounds in the liquid product may be in the form of ammonia and oxy-anions of nitrogen.

The concentrated liquid product may further be processed as a final product. The method may comprise collecting the concentrated liquid product comprising at least a fraction of the nitrogenous liquid, remaining nitrogenous compounds (for example, nitrogenous compounds that have not been oxidized), and the oxy-anions of nitrogen. The concentrated liquid product may be processed as a liquid fertilizer. In some embodiments, the methods may comprise combining the liquid product with a salt to produce a fertilizer. The salt and/or concentration of the salt added may be selected to control composition of the fertilizer product. Thus, a fertilizer product having an effective amount of nitrogenous compounds and desired composition may be produced by collecting and processing high nitrogenous waste.

Concentrating the stabilized nitrogenous liquid to produce the liquid product may also produce a dilute water. The dilute water may have less than 10% w/v nitrogenous compounds of the liquid waste. For example, the dilute water may have less than 5% w/v nitrogenous compounds of the liquid waste.

The methods disclosed herein may comprise directing the dilute water to an on-site water demand. In some embodiments, the on-site water demand may be a component of the system for recovery of nitrogenous compounds. For example, dilute water may be directed to the reactor to control composition of the intermediate liquid product. In some embodiments, dilute water may be directed upstream from the reactor. An amount of dilute water effective to inhibit formation of crystals (as previously described) may be directed to the liquid waste or intermediate liquid waste.

In some embodiments, the on-site water demand may be separate from the system for recovery of nitrogenous compounds. Exemplary on-site water demands include manure flushing, irrigation, or other agricultural and farm uses, such as cleaning. Exemplary on-site water demands include industrial uses. Dilute water may be directed to an on-site heating or cooling system. Dilute water may be directed to an on-site wastewater treatment system.

In accordance with another aspect, there is provided a system for recovering nutrients from a high nitrogenous waste. The system may comprise a reactor fluidly connected to a source of a liquid waste and a source of an oxidant. The reactor may be configured to combine the liquid waste and oxidant to produce an intermediate liquid waste having oxy-anions of nitrogen, as previously described. The reactor may be a tank reactor. The reactor may be aerated. The reactor may be stirred.

In some embodiments, the reactor may be a bioreactor. The bioreactor may comprise microorganisms for catalyzing the oxidation reaction. The bioreactor may be constructed and arranged to contact the biological microorganisms with the liquid waste or intermediate nitrogenous waste to enhance oxidation. The bioreactor may be configured to contain suspended microorganisms. The bioreactor may comprise a substrate attaching a biofilm of the microorganisms. The substrate may be suspended in the bioreactor. The substrate may be agitated in the bioreactor.

The system may comprise a plurality of reactors. The plurality of reactors may be positioned in series. The plurality of reactors may be positioned in parallel. In certain embodiments, a subset of the plurality of reactors may be arranged in series, with multiple subsets arranged in parallel, forming an array of reactors. In certain embodiments, a first reactor in a series may be a bioreactor. In certain embodiments, a second or subsequent reactor in a series may be a bioreactor.

The source of the liquid waste may be configured to provide a liquid waste to the reactor. The source of the liquid waste may be associated with an organic waste, for example, animal manure or animal litter (comprising, e.g., urine and/or solids), sewage sludge, food waste, or dairy products. The source of the liquid waste may comprise enzymatically hydrolyzed organic waste, organic waste digestate, for example, digestate from the acid digestion step of organic matter, or digestates, condensates, and/or leachates of organic matter or an organic matter wastewater. In certain embodiments, the source of the liquid waste may be a liquid waste having dissolved organic matter. The source of the liquid waste may be associated with an ammonia wastewater, for example, ammonia condensate formed by condensing ammonia from a gas into a liquid, aqua ammonia, ammonia distillate, and/or ammonia stillage. The ammonia distillate may comprise, for example, digestates, condensates, and/or leachates of ammonia distillate. In some embodiments, the system may comprise a liquid waste holding tank, a manure flushing pit, a septic tank, a composter, an organic waste or wastewater treatment unit, or an ammonia wastewater treatment unit.

The system may comprise a source of an oxidant. The source of the oxidant may be configured to provide an oxidant to the reactor. The source of the oxidant may be a source of air, oxygen, ozone, a peroxide, or a halogen, for example, a liquid tank, gas tank, or an air blower. In some embodiments, the source of the oxidant comprises an aeration vent. The source of the oxidant may comprise one or more oxidant pre-treatment units configured to remove contaminants from the oxidant. In some embodiments, the oxidant is fluidly connectable to the reaction subsystem, for example, through one or more oxidant pre-treatment units.

In some embodiments, the oxidant may be a gas, for example, oxygen gas, ozone gas, or air. The reactor may comprise a gas-liquid contactor. The gas-liquid contactor may introduce the oxidant gas into the liquid waste by dispersing the gas with a fine mist of solution or by flowing the gas though a volume of solution. The gas-liquid contactor may be a differential gas-liquid contactor or a stagewise gas-liquid contactor. The reactor may comprise one or more of a gas sparger, a gas-liquid column (for example, a falling-film column, a packed column, a bubble column, or a plate column), a spray tower, an agitated vessel, a scrubber, a rotating disc contactor, a Venturi tube, a dispersion tube, or any other vessel configured to contact a gas and a liquid.

In some embodiments, the oxidant may be a liquid, for example, liquid oxygen, a peroxide, or a halogen in liquid form. In exemplary embodiments, the oxidant may be liquid oxygen. In other exemplary embodiments, the oxidant may be hydrogen peroxide. Other liquid oxidants may be employed. The source of the oxidant may be a liquid tank or reservoir.

The system may comprise a pH control subsystem configured to maintain a predetermined pH within the reactor. The pH control subsystem may comprise a pH meter configured to measure pH of a solution within the system, for example, of the liquid waste, the intermediate liquid waste, and/or the stabilized liquid waste. One or more setting may be adjusted manually or automatically upon measuring the pH. The pH control subsystem may comprise a control module electrically connected to the pH meter. The control module may be configured to adjust pH within the subsystem, for example, manually or automatically, responsive to a measurement obtained by the pH meter. The pH may be adjusted as required by addition of a pH adjuster, adjusting flow rate of the liquid waste, adjusting flow rate of oxidant (for example, increasing or decreasing aeration), or by dilution or evaporation of a solution within the system. In particular, pH may be adjusted by adjusting a concentration of oxy-anions in the intermediate nitrogenous liquid or the stabilized nitrogenous liquid.

The control module may be configured to adjust pH to a value as previously described herein. For example, in some embodiments, the control module may be configured to maintain a pH between about 3 and about 9, maintain a pH between about 5 and about 7, maintain a pH between about 6 and about 8.5, or maintain a pH between about 6.7 and about 8.1. In some embodiments, a pH may be maintained between 4-5, 4-6, 4-7, 4-8, 4-9, 5-6, 5-7, 5-8, 5-9, 6-7, 6-8, 6-9, 7-8, 7-9, or 8-9. The control module may be configured to maintain a pH correlated to a desired concentration of nitrogen oxy-anions in solution, for example, as shown in FIGS. 1A-1C. In some embodiments, the pH may be selected such that at least 50% of the nitrogenous compounds are oxidized. The pH may be selected such that at least 55%, 60%, 65%, 70%, 75%, 80%, 85%, 90%, 95%, 99%, or 100% of the nitrogenous compounds are oxidized to oxy-anions of nitrogen. The selection of pH will generally depend on the desired composition of the final product.

In some embodiments, the pH control subsystem may comprise at least one flow controller configured to control flow rate of the liquid waste and/or the source of the oxidant. The flow controller may be operatively connected to the control module. The control module may be configured to instruct the flow controller to increase or decrease flow rate of the liquid waste and/or the source of the oxidant into the reactor responsive to the pH measured by the pH meter. For example, the control module may be configured to instruct the flow controller to increase or decrease flow rate of the liquid waste and/or or the source of the oxidant to control pH within the reactor to the preselected pH value. The flow controller may comprise a pump. The flow controller may comprise a valve. The flow controller may comprise a flow meter.

In some embodiments, the pH control subsystem may comprise a source of a pH adjuster. The source of the pH adjuster may be fluidly connected to the reactor. In general, the pH adjuster may be a base. In certain embodiments, the pH adjuster may be an acid.

The system may comprise a source of a base. The source of the base may be configured to provide a base to the reactor. The source of the base may comprise an acid base production subsystem, such that the source of the base may receive a salt of a base and water, and discharge a cation stream and an anion stream. The acid base production subsystem may be constructed and arranged to introduce salt into the water and electrically separate ions in the salt solution to produce the basic stream (cation stream) and an acidic stream (anion stream). In some embodiments, the acid base production subsystem comprises an ion exchange separation device or an electrically driven membrane separation device, for example, an electrodialysis unit. The acid base subsystem may have a salt inlet, a water inlet, a cation stream outlet, and an anion stream outlet. The acid base production subsystem may be fluidly connectable to the reactor, such that the cation stream may be conveyed to the reactor as the pH adjuster.

The source of the base may further comprise one or more base pre-treatment units configured to remove contaminants from any one or more of the base, the salt, the water, the anion stream, or the cation stream. In some embodiments, the base is fluidly connectable to the reactor, for example, through one or more base pre-treatment units. The salt or the water may be fluidly connectable to the acid base production subsystem through one or more base pre-treatment units. The anion stream may be fluidly connectable to the second reaction subsystem through one or more base pre-treatment units.

The system may comprise a dissolved solids concentrator configured to produce a concentrated liquid product and a dilute water from the stabilized nitrogenous liquid waste. The dissolved solids concentrator may be fluidly connected downstream from the reactor. The dissolved solids concentrator may employ one or more of reverse osmosis (RO), ion exchange, electrodialysis (ED), capacitive deionization, evaporation, or other similar process to separate dissolved solids from a liquid product. The dissolved solids concentrator may comprise a product outlet and a dilute liquid outlet. The product may be further processed for use, for example, by further concentration and/or by post-treatment as fertilizer.

In certain embodiments the system may comprise a plurality of dissolved solids concentrators fluidly connected downstream from the reactor in series. For instance, the system may comprise a first dissolved solids concentrator having an inlet fluidly connected to the reactor and a second dissolved solids concentrator having an inlet fluidly connected to the first dissolved solids concentrator. In exemplary embodiments, the system may comprise a reverse osmosis unit and an evaporator fluidly connected downstream from the reactor in series.

The concentrated liquid product may be directed to a fertilizer production unit. In some embodiments, the system may comprise the fertilizer production unit. In some embodiments, the concentrated liquid product may be transported to an off-site fertilizer production unit. The fertilizer production unit may comprise a mixing chamber. The fertilizer production unit may be fluidly connected to a source of a salt. The salt may be selected to control composition of the final product.

The dilute water may be recirculated in the system. For instance, a dilute water outlet of the dissolved solids concentrator may be fluidly connected to the reactor or a unit operation upstream from the reactor. In some embodiments, the system may comprise a recirculation line extending between the dissolved solids concentrator and an inlet of the reactor. The recirculation line may be constructed and arranged to reintroduce dilute liquid from the dissolved solids concentrator to the reactor.

The recirculation line may provide further control of the concentration of the TDS throughout the process. Liquid from the reactor may be conveyed to the dissolved solids concentrator, for example, to an evaporator or reverse osmosis unit, to adjust the solids concentration within the dissolved solids concentrator. Where the liquid is conveyed to an evaporator, the concentrated liquid may then be conveyed to a solids-liquid separation unit to remove excess solids from the liquid fraction. The liquid fraction may be used as a product or returned to the reactor. In this embodiment, the system could produce a dilute liquid product or a concentrated product by controlling the operating conditions.

The dilute water may be fluidly connected to an on-site water demand. In some embodiments, the on-site water demand may be a component of the system. For example, dilute water may be directed through the recirculation line. In some embodiments, the on-site water demand may be separate from the system. Exemplary on-site water demands include manure flushing, irrigation, or other agricultural and farm uses, such as cleaning. Exemplary on-site water demands include industrial uses. Dilute water may be directed to an on-site heating or cooling system. Dilute water may be directed to an on-site wastewater treatment system.

In certain embodiments, the system may comprise a solids-liquid separator fluidly connected to a source of a high nitrogenous waste. The solids-liquid separator may be configured to separate solids from the high nitrogenous waste and produce the liquid waste, which is directed to the reactor for oxidation, as previously described. The solids may be directed to a solids treatment unit.

The solids-liquid separator may be a course suspended solids separator. In certain exemplary embodiments, the solids-liquid separator may be a centrifuge or hydrocyclone. In some embodiments, the solids-liquid separator may be a sedimentation unit. In some embodiments, the solids-liquid separator may be a filter, for example, a coarse filter. In particular embodiments, the coarse filter may be a filter in the ground where manure is collected. The solids-liquid separator may employ one or more of centrifugation, sedimentation (for example, comprising a clarifier or thickener), filtration (for example, by size, charge, or density) (for example, nanofiltration, microfiltration, ultrafiltration, or another membrane filtration), evaporation, or other similar process to separate suspended solids from the liquid waste.

The solids outlet of the solids-liquid separator may be connectable to a solids treatment unit. In some embodiments, the system may comprise the solids treatment unit. In other embodiments, the solids may be transported to an off-site solids treatment unit. The solids treatment unit may comprise, for example, a composter and/or an anaerobic digester. The composter may comprise a tank or reactor comprising aerobic microorganisms. The anaerobic digester may comprise a tank or reactor comprising anaerobic microorganisms. A source of nutrients to facilitate digestion may be fluidly connected to the composter and/or anaerobic digester.

In some embodiments, the system may comprise a pre-treatment unit positioned upstream from the reactor. The pre-treatment unit may be configured to remove contaminants harmful to reactor microorganisms upstream from the reactor. In some embodiments, the pre-treatment unit has an inlet fluidly connected to the source of the high nitrogenous waste and an outlet fluidly connected to the reactor or a solids-liquid separation unit upstream from the reactor. In some embodiments, the pre-treatment unit has an inlet fluidly connected to a liquid waste outlet of a solids-liquid separation unit and an outlet fluidly connected to the reactor.

One exemplary pre-treatment unit comprises a phosphorus removal unit. The phosphorus removal unit may be configured to remove phosphorus from the high nitrogenous waste and/or the liquid waste. The phosphorus removal unit may be a biological phosphorus removal unit, comprising a tank or reactor comprising phosphorus accumulating organisms (PAOs). In some embodiments, a plurality of reactors may be arranged to induce biological phosphorus removal. Other pre-treatment units may be employed for removal of phosphorus or other contaminants.

In certain embodiments, the system may comprise a second solids-liquid separator fluidly connected to an outlet of the reactor and an inlet of the dissolved solids concentrator. The second solids-liquid separator may be configured to separate solids from the stabilized nitrogenous liquid and produce a liquid, which is directed to the dissolved solids concentrator. The second solids-liquid separator may be a fine solids separator. In certain exemplary embodiments, the second solids-liquid separator may be a sedimentation unit, a microfiltration unit, or an ultrafiltration unit.

In some embodiments, the second solids-liquid separator employs filtration (for example by size, charge, or density) to separate a liquid fraction from solids. In some embodiments, the second solids-liquid separator employs sedimentation (for example, comprising a clarifier or thickener) to separate a liquid fraction from solids. The second solids-liquid separator may comprise a solids outlet and a liquid product outlet. The liquid product may comprise nitrogenous liquid fertilizer. The liquid product may be further processed for use, for example, as a fertilizer.

The solids outlet of the second solids-liquid separator may be fluidly connected to the reactor. The system may comprise a solids recirculation line extending from the solids outlet of the second solids-liquid separator and the reactor. Some of the solid fraction may be returned to the reactor, while some of the solid fraction may be removed from the system as waste. In some embodiments, for example, in embodiments in which the system employs biological organisms to catalyze oxidation reactions, the solids retained may comprise biological flocs of organisms. The biological flocs may be returned to the reaction subsystem to further catalyze oxidation reactions. In some embodiments, the solids may comprise crystals of ammonium salts, or other precipitates, such as calcium sulfate or iron oxides, formed from elements present in the water and the absorbed gases. The nature of the solids separated will generally depend on the design and operational conditions of the system and method. The composition of the solid and/or liquid product may be controlled by adding salts to the process liquids.

In some embodiments, the system may comprise a source of a salt. The source of the salt may be fluidly connectable to the reactor. The source of the salt may comprise a mixing chamber. For example, the source of the salt may comprise a mixing chamber constructed and arranged to combine the salt with water or with nitrogenous liquid. The source of the salt may be positioned upstream or downstream from the reactor. In some embodiments, the source of the salt may be configured to introduce the salt into the liquid upstream of the reactor. The source of the salt may comprise one or more salt pre-treatment units configured to remove contaminants from the salt. In some embodiments, the salt is fluidly connectable to the reactor, for example, through one or more salt pre-treatment units.

The system may comprise a temperature control subsystem configured to maintain a predetermined temperature within the reactor. The temperature control subsystem may comprise a temperature sensor. The temperature sensor may be configured to measure temperature of one or more solution within the system. For example, the temperature sensor may be configured to measure temperature of the intermediate nitrogenous liquid within the reactor, of the high nitrogenous waste, of the liquid waste, or of the oxidant. One or more setting may be adjusted manually or automatically upon measuring the temperature.

The temperature control system may comprise a control module electrically connected to the temperature sensor. The control module may be configured to maintain a predetermined temperature range, as previously described herein, within the reactor. In some embodiments, the control module may be configured to adjust a temperature within the reactor, for example, manually or automatically, responsive to a measurement obtained by the temperature sensor. In some embodiments, the predetermined temperature range is between about 4° C. and about 80° C., for example, between about 10° C. and about 80° C.

The temperature control subsystem may comprise a heat exchanger. The system may employ active or passive heat transfer to control the temperature. In some embodiments, the temperature control subsystem comprises a chiller or cooling tower. In some embodiments, the temperature control subsystem comprises a cooling and heating unit. The system may further be configured to provide heat to the source of the high nitrogenous waste. The system may be configured to provide heat to the source of the oxidant. The system may comprise a heat exchanger constructed and arranged to transfer heat between components of the system. The heat exchanger may employ mechanisms to diffuse heat within the system, for example, to conserve heat energy. In some embodiments, the heat exchanger is employed to adjust a temperature within the reactor to a working temperature, as previously described herein. In some embodiments, the heat exchanger may be configured to adjust the temperature within the reactor to between about 4° C. and about 80° C., for example, between about 10° C. and about 80° C.

The system may comprise an oxidation control subsystem. The oxidation control subsystem may be configured to maintain a predetermined oxidation reduction potential (ORP) within the reactor. In some embodiments, the oxidation control system may comprise ORP sensor configured to measure ORP of a solution within the reactor. One or more setting may be adjusted manually or automatically upon measuring the ORP. The system may further comprise a control module electrically connected to the ORP sensor. The control module may be configured to adjust the ORP within the reactor, for example, manually or automatically, responsive to a measurement obtained by the ORP sensor. The control module may be configured to provide more or less oxidant to the reactor, to adjust the ORP therein. The control module may be configured to increase or decrease flow rate of the liquid waste into the reactor, to adjust the ORP therein.

In some embodiments, the predetermined ORP is between about +400 mV and about +900 mV. The predetermined ORP may be between about +200 mV and about +1200 mV, between about +400 mV and about +1000 mV, between about +500 mV and about +700 mV, between about +400 mV and about +600 mV, between about +500 mV and about +800 mV, or between about +600 mV and about +900 mV. The predetermined ORP may be about +400 mV, about +500 mV, about +600 mV, about +700 mV, about +800 mV, or about +900 mV. The predetermined ORP may be less than about +900 mV, less than about +800 mV, less than about +700 mV, less than about +600 mV, less than about +500 mV or less than about 400 mV. In some embodiments, the predetermined ORP may be more than about +400 mV, more than about +500 mV, more than about +600 mV, more than about +700 mV, more than about +800 mV, or more than about +900 mV.

In some embodiments, the system may comprise a conductivity meter. The conductivity meter may be configured to measure conductivity of a solution within the reactor. One or more settings may be adjusted manually or automatically upon measuring the conductivity. The system may comprise a control module electrically connected to the conductivity meter. The control module may be configured to adjust the conductivity of the solution within the reactor, for example manually or automatically, responsive to a measurement obtained by the conductivity meter. In some embodiments, the control module may adjust conductivity by adjusting one or more of pH, temperature, concentration of ions (for example, by adding a salt), flow rate of the liquid waste, flow rate of the oxidant, or flow rate of the base into the reactor.

In accordance with certain embodiments, the control module may be configured to maintain a predetermined concentration of TDS in the solution within the reactor. For instance, the control module may be configured to maintain a concentration of TDS below a threshold concentration to avoid formation of crystals. The control module may be configured to maintain a concentration of TDS in the solution within the reactor above a threshold concentration to induce formation of crystals. The threshold concentration may be selected based on the composition of the solution, which in turn may generally depend on composition of the waste, selection of the oxidant, and any base and/or salt added.

In certain embodiments, composition of the final product may be controlled or designed for a particular use by selecting the base and/or salt. In some embodiments, the control module may adjust a concentration of TDS within the reaction subsystem by adjusting one or more of pH, temperature, concentration of ions (for example, by adding a salt), flow rate of the liquid waste, flow rate of the oxidant, or flow rate of the base into the reactor.

The system may comprise one or more control module. The control module may be a computer or mobile device. The control module may comprise a touch pad or other operating interface. For example, the control module may be operated through a keyboard, touch screen, track pad, and/or mouse. The control module may be configured to run software on an operating system known to one of ordinary skill in the art. The control module may be electrically connected to a power source. The control module may be digitally connected to the one or more components. The control module may be connected to the one or more components through a wireless connection. For example, the control module may be connected through wireless local area networking (WLAN) or short-wavelength ultra-high frequency (UHF) radio waves. The control module may further be operably connected to any additional pump or valve within the system, for example, to enable the control module to direct fluids or additives as needed. The control module may be coupled to a memory storing device or cloud-based memory storage.

Multiple control modules may be programmed to work together to operate the system. For example, a control module may be programmed to work with an external computing device. In some embodiments, the control module and computing device may be integrated. In other embodiments, one or more of the processes disclosed herein may be manually or semi-automatically executed.

FIG. 2 presents one exemplary embodiment of the system. A schematic of an exemplary system for the recovery of nitrogenous compounds in the form of a liquid product is shown in FIG. 2. A liquid containing nitrogenous compounds 114 may be introduced into a reactor 100 and put in contact with an oxidant 104. Optionally, a base 102 may be introduced into the reactor 100. A pH control subsystem 174 is configured to maintain a predetermined pH of the liquid within reactor 100. Stabilized nitrogenous liquid 122 may be transferred to a dissolved solids concentrator 120 to remove dilution water 124 and produce a concentrated product 126. Excess solids 108 may be conveyed out of the system. Dilution water 124 may be directed to an on-site demand.

FIG. 3 illustrates another embodiment. In the exemplary embodiment of FIG. 3 a solids-liquid separator 134 may be positioned upstream from the reactor 100 before liquid containing nitrogenous compounds 114 is introduced into reactor 100. This configuration may be employed, for example, when the nitrogenous waste 123 has a greater concentration of solids. Nitrogenous waste 123 may be directed to the solids-liquid separator 134 to produce the liquid containing nitrogenous compounds 114 which is conveyed to the reactor 100. The stream containing separated solids 136 may be directed to a solids treatment unit 138.

Figure 4:
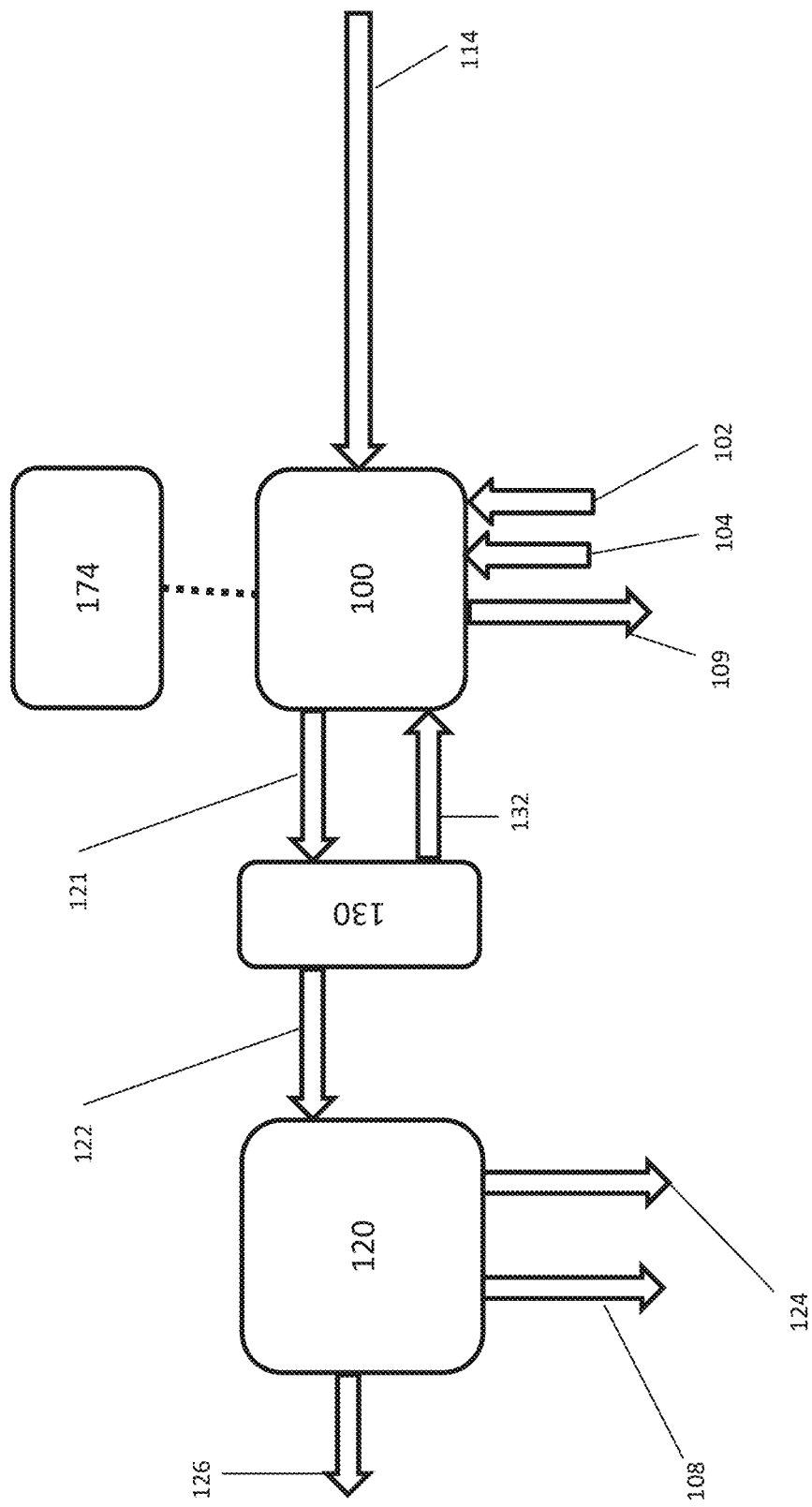
FIG. 4 is a box diagram of an alternate system for recovering nutrients from a nitrogenous liquid, according to one embodiment.

FIG. 4 illustrates another embodiment. In the exemplary embodiment of FIG. 4 a solids-liquid separator 130 may be coupled to the reactor 100 before the stabilized nitrogenous liquid 122 is conveyed to the dissolved solids concentrator 120. This configuration may be employed, for example, when the oxidation reaction is catalyzed by microorganisms. The liquid product 121 after reaction may be conveyed to the solids-liquid separator 120. The stream containing separated solids 132 may be returned to reactor 100. Excess solids 109 may be removed from the reactor 100.

Figure 5:
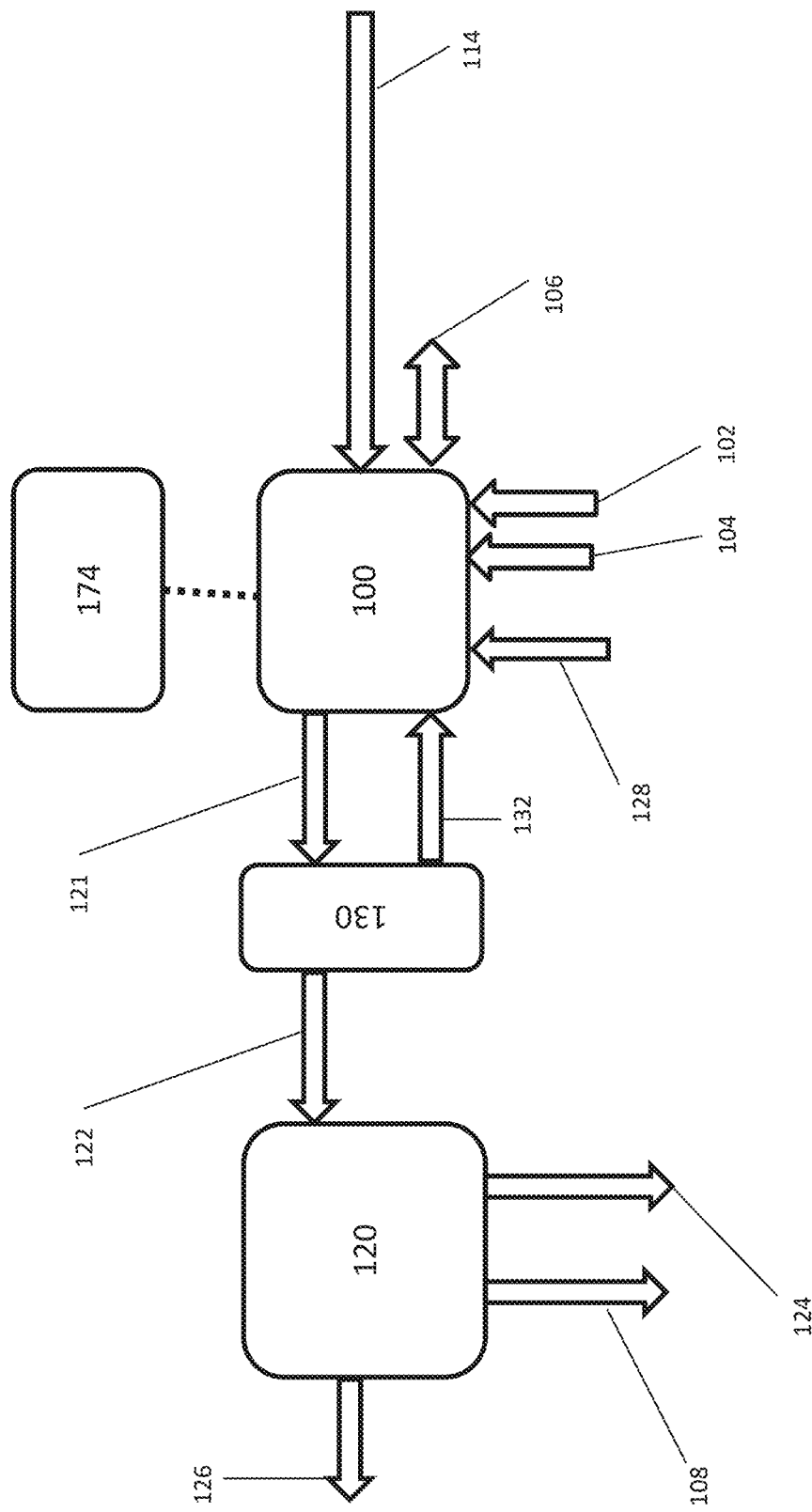
FIG. 5 is a box diagram of an alternate system for recovering nutrients from a nitrogenous liquid, according to one embodiment.

FIG. 5 illustrates another embodiment. In the exemplary embodiment of FIG. 5, dilution water 128 is directed to the reactor 100. Temperature of the reactor 100 may be controlled. In some embodiments, heat 106 may be added or removed from one or more components of the system. Heat 106 may be added or removed from the system using a heat exchanger or by evaporating or condensing water in the system to control temperature.

Figure 6:
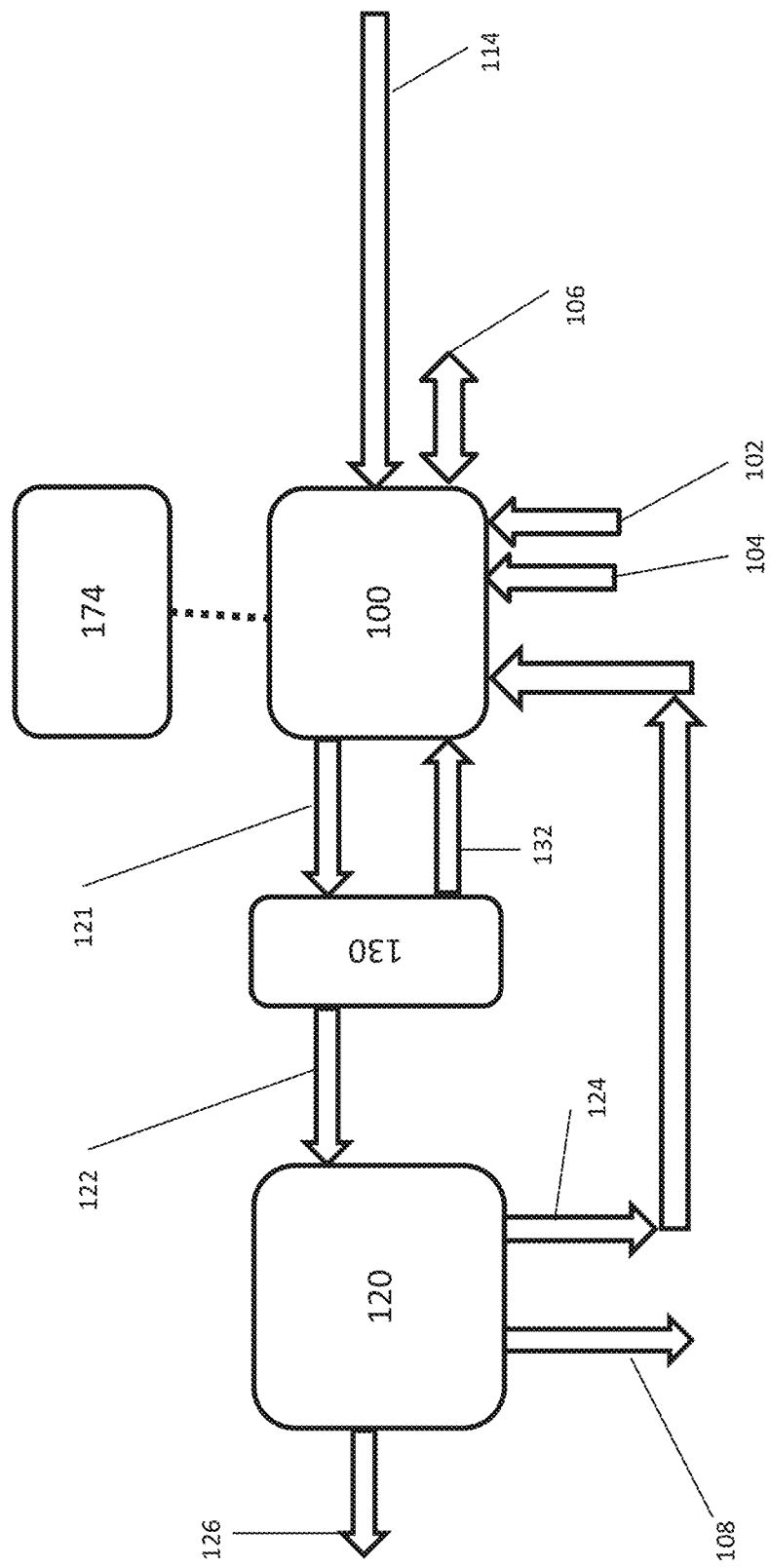
FIG. 6 is a box diagram of an alternate system for recovering nutrients from a nitrogenous liquid, according to one embodiment.

FIG. 6 illustrates another embodiment. In the exemplary embodiment of FIG. 6, dilution water 124 is directed from dissolved solids concentrator 120 to reactor 100.

Figure 7:
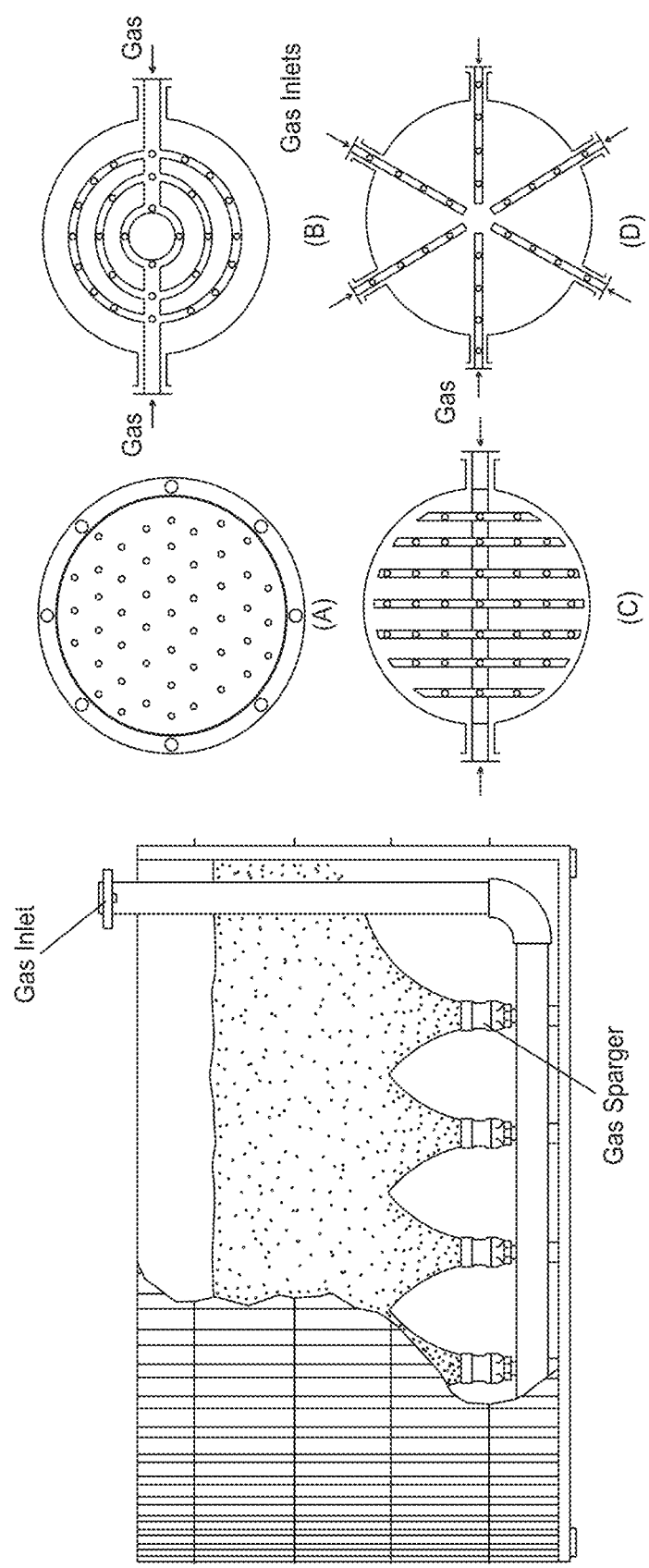
FIG. 7 is a schematic drawing of a reactor, according to one embodiment.

FIG. 7 illustrates one embodiment of the reactor 100. In the exemplary embodiment of FIG. 7 a tank containing the intermediate nitrogenous liquid with submerged gas spargers is used. Fine bubbles of the oxidant, e.g., air, are created by the gas spargers, inducing oxidation of the nitrogenous liquid, for example, according to Equations (1) to (7) above.

Figure 8:
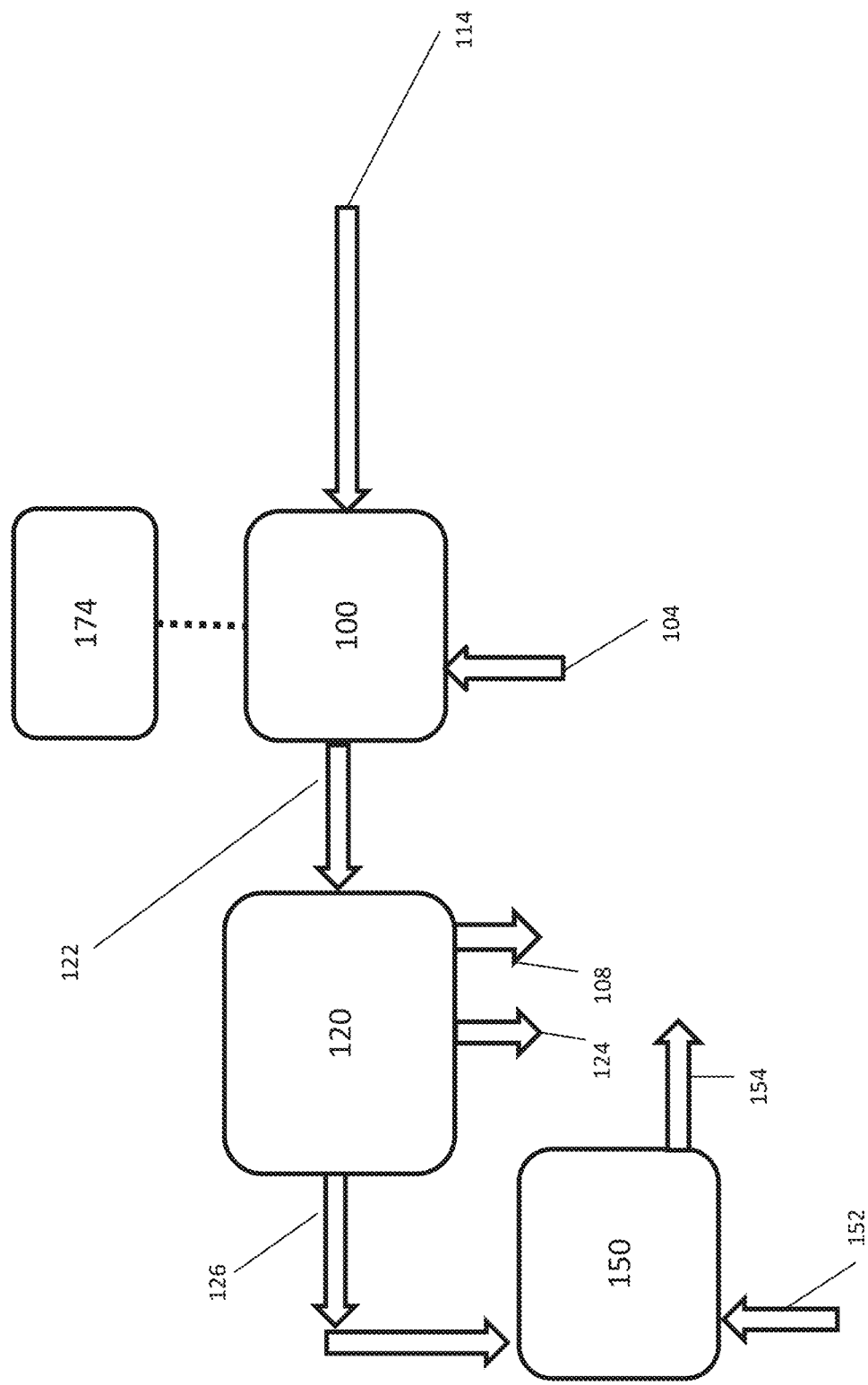
FIG. 8 is a box diagram of an alternate system for recovering nutrients from a nitrogenous liquid, according to one embodiment.

FIG. 8 illustrates another embodiment of the system. In the exemplary embodiment of FIG. 8 the concentrated liquid product 126 after the dissolved solids concentrator 120 may be combined with a salt 152 in a mixing chamber 150. The salt may be selected to control composition of final product 154. In certain embodiments, no base is added to the reaction chamber 100 and, instead, the salt of the base 152 may be added in the mixing chamber 150, as required, to control composition of the final product 154.

Figure 9:
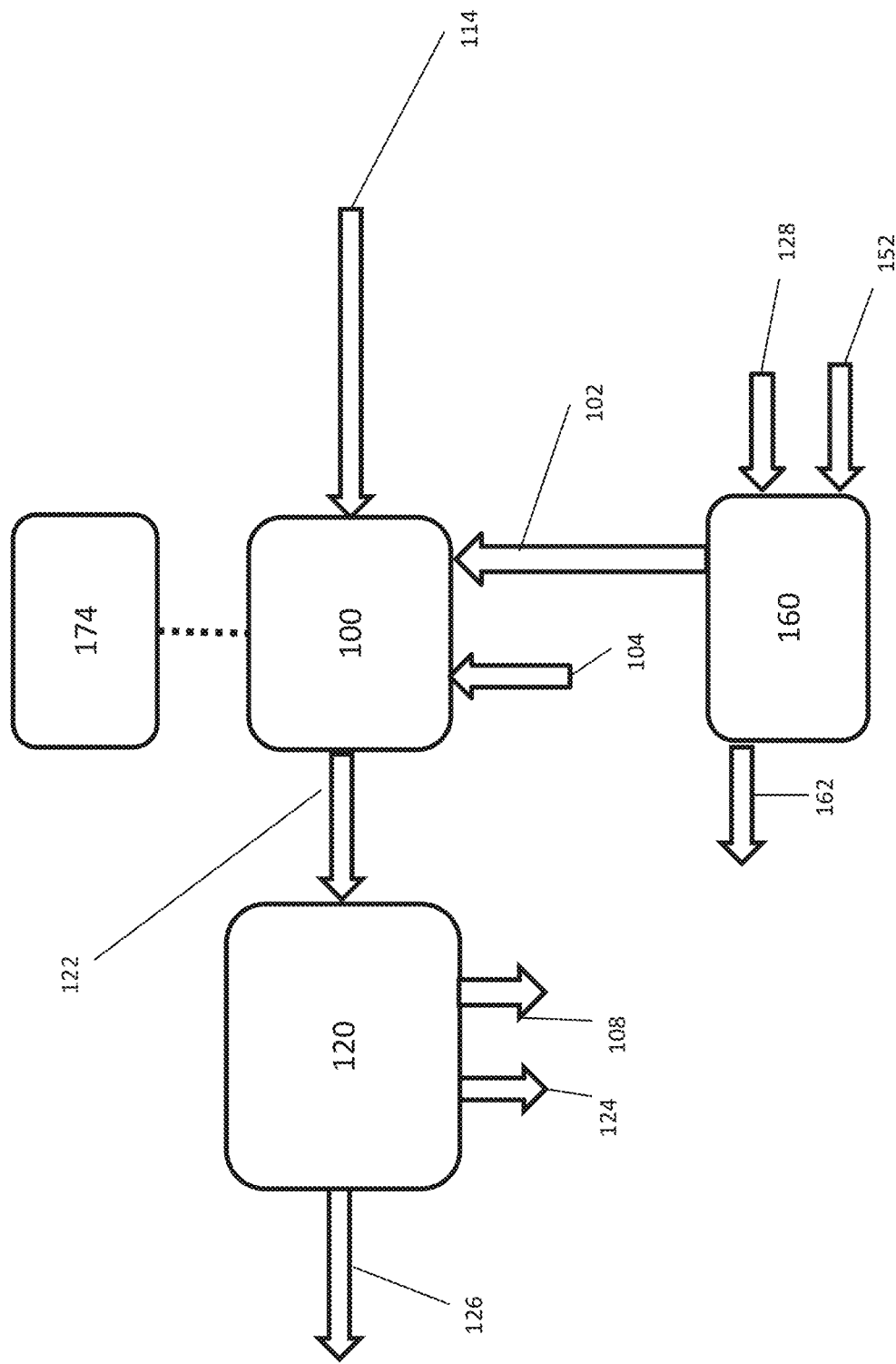
FIG. 9 is a box diagram of an alternate system for recovering nutrients from a nitrogenous liquid, according to one embodiment.

FIG. 9 illustrates another embodiment. In the exemplary embodiment of FIG. 9, the process employs an acid base production chamber 160. The cation stream from the acid base production chamber may be introduced into the reactor 100 as the base 102. The anion stream may be used as an acid 162 for on-site or off-site purposes. This arrangement may employ the use of a salt 152 and water 128 for capturing nitrogenous compounds as needed, to produce the desired final product.

The systems disclosed herein may comprise a plurality of channels extending between separate components of the system for delivering gases and solutions between the components of the system. The systems may comprise one or more pumps, blowers, or fans to drive gases and solutions within the system. The systems may further comprise one or more tanks for holding gases or solutions, for example, product tanks for holding liquid product and/or product comprising solids.

Figure 10:
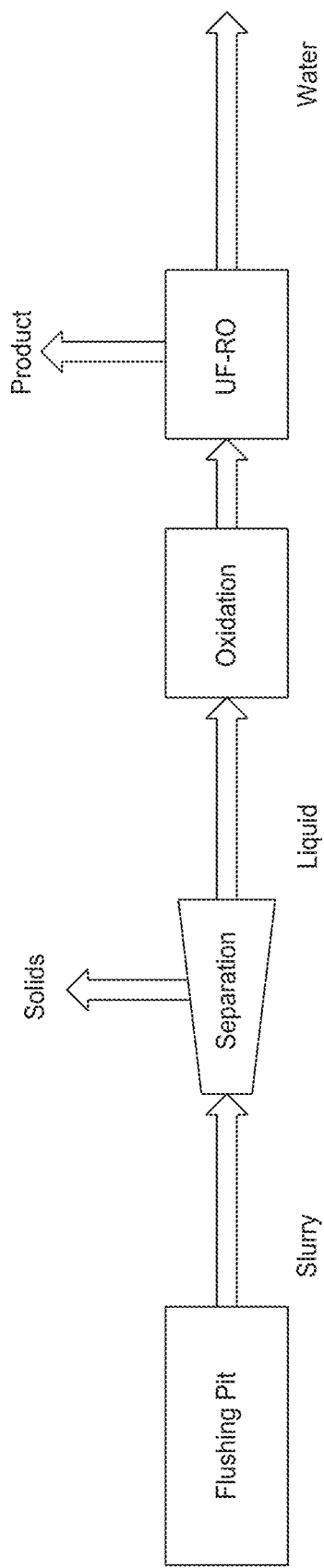
FIG. 10 is a box diagram showing a method for recovering nutrients from a nitrogenous liquid, according to one embodiment.

FIG. 10 illustrates one exemplary embodiment for a method of recovering nitrogenous compounds from a nitrogenous waste. The exemplary embodiment of FIG. 10 illustrates a method where organic waste from a swine flushing pit is separated to produce a liquid waste and solids. The liquid waste is directed to an oxidation reactor. In the exemplary embodiment of FIG. 10, an oxidant (for example, oxygen) is combined with the liquid waste. A stabilized nitrogenous liquid containing oxy-anions of nitrogen is produced by the oxidation. The stabilized nitrogenous liquid is concentrated by ultrafiltration-reverse osmosis to remove a dilute water and produce a concentrated liquid product. A laboratory trial of the method of FIG. 10 is described in more detail below.

Figure 11:
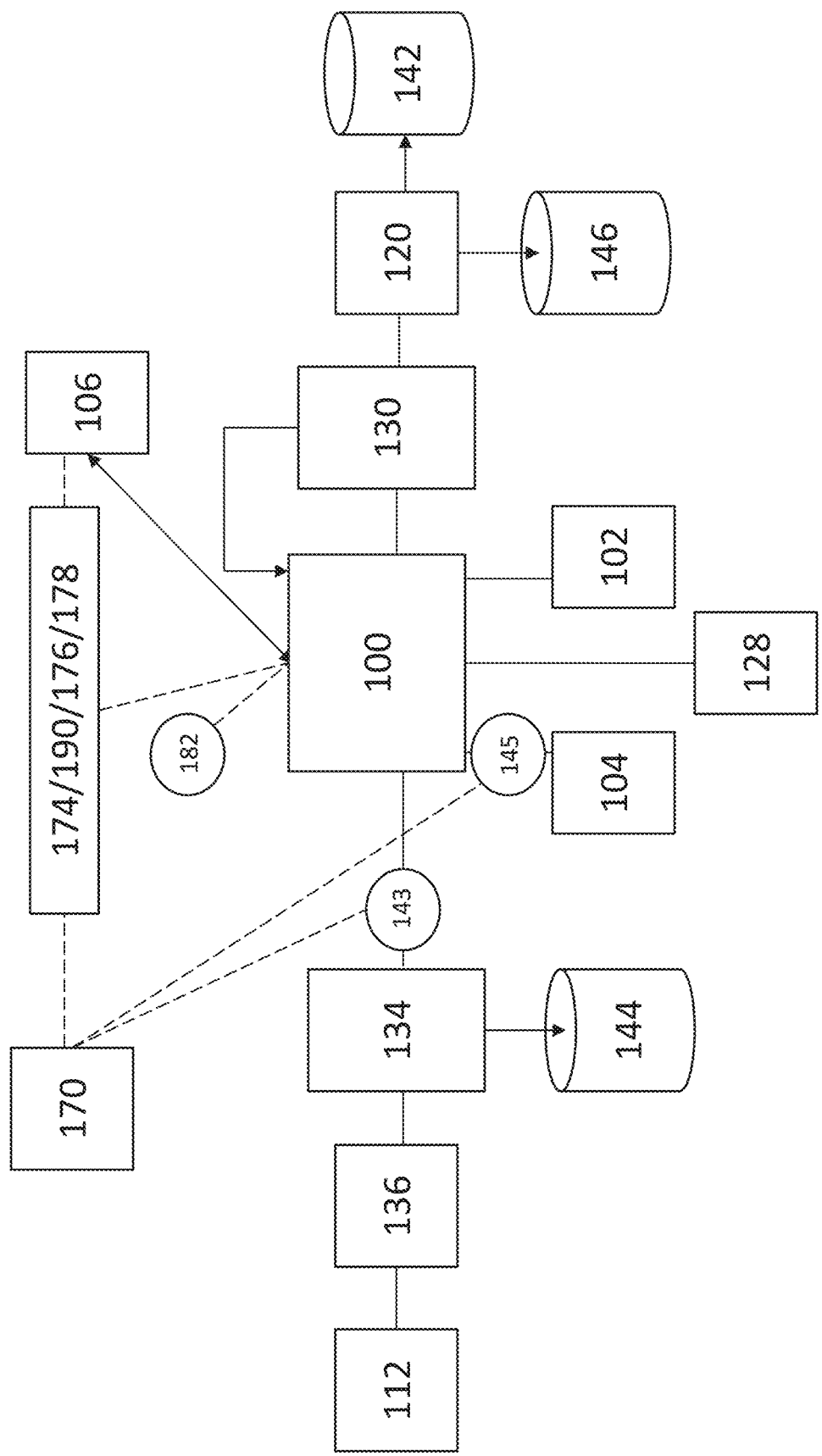
FIG. 11 is a box diagram of an alternate system for recovering nutrients from a nitrogenous liquid, according to one embodiment.

FIG. 11 illustrates another embodiment of a system. The exemplary embodiment of FIG. 11 includes source of nitrogenous waste 112, pre-treatment unit 136, solids-liquid separator 134, reactor 100, second solids liquid separator 130, and dissolved solids concentrator 120. In the exemplary embodiment of FIG. 11, a nitrogenous waste 112 is directed to pre-treatment unit 136 to remove contaminants. The pre-treatment unit may be a phosphorus removal unit, such as a biological phosphorus removal unit, or any other contaminant removal. In FIG. 11, pre-treatment unit 136 is positioned upstream from solids-liquid separator 134. However, pre-treatment unit 136 may be positioned downstream from solids-liquid separator 134.

The waste is directed to solids-liquid separator 134 to produce solids and a liquid waste. The liquid waste is directed to reactor 100. A source of an oxidant 104 and a source of a base 102 are fluidly connected to the reactor 100. The liquid waste, oxidant, and base may be combined in the reactor 100. A source of a salt 117 may fluidly connected to the reactor 100, depending on the desired composition of the final product. Optionally, dilution water 128 may be fluidly connected to the reactor 100. In certain embodiments, dilution water 128 may be directed from dissolved solids concentrator 120 (shown in FIG. 6).

A pH control unit 174 may provide pH control to the system. The pH control unit 174 may be operatively connected to liquid waste flow controller 143 and/or oxidant flow controller 145. The pH control unit 174 may be operatively connected to source of the base 102. A temperature control unit 190 may provide temperature control to the system. Temperature control unit 190 may be operatively connected to heat exchanger 106. An oxidation control unit 176 may provide oxidation control to the system. Ion concentration control unit 178 may provide ion concentration control to the system.

A sensor or meter 182 (for example, temperature sensor, pH meter, ORP sensor, and/or conductivity meter) may be configured to take measurements within reactor 100. A control module 170 may be electrically connected to the sensor or meter 182, for example via one or more wires (not shown) or wirelessly. Control module 170 may be operatively connected to any one or more of pH control unit 174, temperature control unit 190, oxidation control unit 176, and ion concentration control unit 178.

Stabilized nitrogenous liquid may be removed from the reactor 100 and concentrated, for example in dissolved solids concentrator 120, to produce a concentrated liquid product and dilute water. The concentrated product may be stored in tank 142. The concentrated product may be stored, used, or processed for further use. The dilute water may be stored in tank 146. The dilute water may be stored, used, or processed for further use. Excess solids removed by solids-liquid separator 134 may be stored in tank 144. The excess solids may be stored, used, or processed for further use. Excess solids removed from second solids-liquid separator 130 may be returned to the reactor 100.

EXAMPLES

The function and advantages of these and other embodiments can be better understood from the following examples. These examples are intended to be illustrative in nature and are not considered to be limiting the scope of the invention.

Example 1: System for Recovery of Nitrogenous Compounds

Operation of an exemplary system for recovery of nitrogenous compounds was estimated using laboratory results. FIG. 10 illustrates the estimated performance of a system processing the manure of 5,000 pigs from a manure flushing pit, corresponding to an estimated nitrogenous waste volume of about 1,300 ft$^3$/day. The estimated flow rates and nitrogen, phosphorous, and potassium content of the process streams are shown in Table 1.

TABLE 1

| | Process Streams | | | |
|---|---|---|---|---|
| | Slurry | Liquid | Product | Water |
| Flowrate (ft$^3$/day) | 1,300 | 1,100 | 75 | 1,025 |
| N (lb/kgal) | 12.5 | 7.5 | 103 | 0.53 |
| P (lb/kgal) | 4.7 | 1.4 | 19 | 0.10 |
| K (lb/kgal) | 9.7 | 8.9 | 123 | 0.63 |

As shown in the exemplary embodiment of FIG. 10, the nitrogenous waste slurry is conveyed to a decanter for separation of the solids and liquids. The liquid waste is estimated to be 1,100 ft$^3$/day. The liquid waste is conveyed to an aerated tank for biological oxidation of the organic and nitrogenous material under controlled pH conditions.

After biological oxidation, the stabilized nitrogenous liquid having an approximate ratio of 50% ammonia and 50% nitrate is directed to an ultrafiltration-reverse osmosis unit for concentration. Water removed from the stabilized nitrogenous liquid (permeate from the reverse osmosis) is estimated to be about 1,025 ft$^3$/day. The water can be directed to an on-site demand, such as for use in the farm. The concentrated liquid product is estimated to be about 75 ft$^3$/day. The concentrated liquid product may be stored on-site for further use.

Accordingly, the system for recovery of nutrients from a high nitrogenous waste produces a concentrated liquid product effective for reuse in agricultural applications.

Example 2: pH Control System

Figure 12:
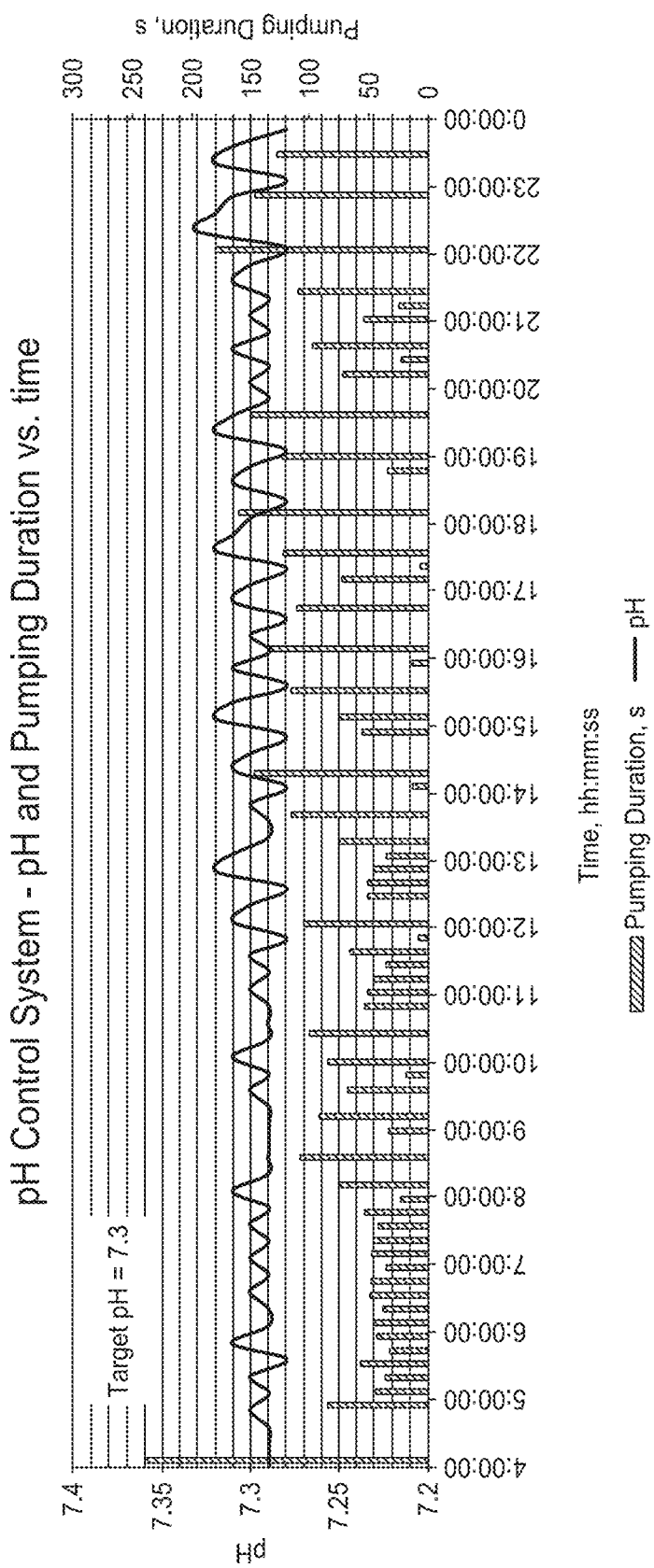
FIG. 12 is a graph showing pH control as a function of rate of introduction of nitrogenous liquid in an oxidation reactor, according to one embodiment.

An exemplary pH control system was operated according to the methods disclosed herein. The results are shown in the graph of FIG. 12. The results correspond to operation of an exemplary pump delivering the high nitrogenous liquid waste to a bioreactor for oxidation of nitrogenous compounds to nitrate. A pH sensor measured pH of the liquid within the bioreactor. In the exemplary embodiment, pH was controlled to about 7.3 by controlling flow rate of the high nitrogenous liquid waste into the reactor. Aeration was maintained substantially constant.

The graph of FIG. 12 shows pH of the bioreactor as a function of amount of time that the high nitrogenous waste pump was on. Pump operation is a proxy for the rate of high nitrogenous liquid waste introduced to the reactor, as the pump was maintained at a constant setting.

As shown in the data of FIG. 12, pH may be controlled to a selected target pH (here approximately 7.3) by controlling a rate of introduction of the liquid waste into the reactor. Thus, oxidation of the high nitrogenous liquid waste (by controlling the rate of delivery of the liquid waste) may control pH and composition of the liquid without addition of an external agent, such as an acid.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of recovering nutrients from a nitrogenous liquid waste having dissolved organic matter, the method comprising:
    producing the nitrogenous liquid waste having dissolved organic matter, without subjecting the organic matter to a drying process, the organic matter comprising animal manure, animal litter, sewage sludge, food waste, dairy products, effluent from anaerobic digestion, or a combination thereof;
    controlling a concentration of dissolved ions in the nitrogenous liquid waste to reduce or avoid inhibition of oxidation by directing dilution water to the nitrogenous liquid waste, as needed;
    introducing the nitrogenous liquid waste having dissolved organic matter and an oxidant into a reactor to produce an intermediate nitrogenous liquid comprising oxyanions of nitrogen;
    maintaining the intermediate nitrogenous liquid at a predetermined pH to control a concentration of the oxyanions of nitrogen and produce a stabilized nitrogenous liquid; and
    concentrating the stabilized nitrogenous liquid to produce a concentrated liquid product and a dilute water.

2. The method of claim 1, further comprising introducing a base into the reactor.

3. The method of claim 1, wherein the predetermined pH is between 3 and 9.

4. The method of claim 1, wherein maintaining the intermediate nitrogenous liquid at the predetermined pH comprises controlling a rate of introduction of the oxidant, controlling a rate of introduction of the nitrogenous liquid waste having dissolved organic matter, introducing a predetermined amount of a base into the nitrogenous liquid waste having dissolved organic matter, or a combination thereof.

5. The method of claim 1, further comprising directing the dilute water to an on-site demand.

6. The method of claim 5, wherein the on-site demand is manure flushing, irrigation, or an industrial use.

7. The method of claim 1, further comprising maintaining a temperature of the nitrogenous liquid waste having dissolved organic matter and/or the intermediate nitrogenous liquid between about 4° C. and about 80° C.

8. The method of claim 1, wherein the oxidant comprises at least one of oxygen, ozone, a peroxide, and a halogen.

9. The method of claim 1, wherein the oxidation is catalyzed by microorganisms.

10. The method of claim 1, wherein concentrating the stabilized nitrogenous liquid comprises directing the stabilized nitrogenous liquid to a membrane based dissolved solids concentrator or an electrochemical separation device.

11. The method of claim 1, further comprising separating suspended solids from the stabilized nitrogenous liquid.

12. The method of claim 1, wherein the oxy-anions of nitrogen comprise at least one of nitrite and nitrate.

13. The method of claim 1, comprising directing the dilution water to the reactor to maintain a total dissolved solids concentration of the nitrogenous liquid waste and/or the intermediate nitrogenous liquid between about 1 g/L and about 500 g/L.

14. The method of claim 13, wherein directing the dilution water to the reactor comprises maintaining the total dissolved solids concentration of the nitrogenous liquid waste and/or the intermediate nitrogenous liquid between about 1 g/L and about 50 g/L.

15. The method of claim 1, comprising directing the dilute water to the reactor as the dilution water.

16. A method of recovering nutrients from an ammonia distillate, the method comprising:
    controlling a concentration of dissolved ions in the ammonia distillate to reduce or avoid inhibition of oxidation by directing dilution water to the ammonia distillate, as needed;

introducing the ammonia distillate and an oxidant into a reactor to produce an intermediate nitrogenous liquid comprising oxy-anions of nitrogen;

maintaining the intermediate nitrogenous liquid at a predetermined pH to control a concentration of the oxy-anions of nitrogen and produce a stabilized nitrogenous liquid; and concentrating the stabilized nitrogenous liquid to produce a concentrated liquid product and a dilute water.

17. The method of claim 16, further comprising introducing a base into the reactor.

18. The method of claim 16, wherein the predetermined pH is between 3 and 9.

19. The method of claim 16, wherein maintaining the intermediate nitrogenous liquid at the predetermined pH comprises controlling a rate of introduction of the oxidant, controlling a rate of introduction of the ammonia distillate, introducing a predetermined amount of a base into the ammonia distillate, or a combination thereof.

20. The method of claim 16, further comprising directing the dilute water to an on-site demand.

21. The method of claim 20, wherein the on-site demand is manure flushing, irrigation, or an industrial use.

22. The method of claim 16, further comprising maintaining a temperature of the ammonia distillate and/or the intermediate nitrogenous liquid between about 4° C. and about 80° C.

23. The method of claim 16, wherein the oxidant comprises at least one of oxygen, ozone, a peroxide, and a halogen.

24. The method of claim 16, wherein the oxidation is catalyzed by microorganisms.

25. The method of claim 16, wherein concentrating the stabilized nitrogenous liquid comprises directing the stabilized nitrogenous liquid to a membrane based dissolved solids concentrator or an electrochemical separation device.

26. The method of claim 16, further comprising separating suspended solids from the stabilized nitrogenous liquid.

27. The method of claim 16, wherein the oxy-anions of nitrogen comprise at least one of nitrite and nitrate.

28. The method of claim 16, comprising directing the dilution water to the reactor to maintain a total dissolved solids concentration of the ammonia distillate and/or the intermediate nitrogenous liquid between about 1 g/L and about 500 g/L.

29. The method of claim 28, wherein directing the dilution water to the reactor comprises maintaining the total dissolved solids concentration of the ammonia distillate and/or the intermediate nitrogenous liquid between about 1 g/L and about 50 g/L.

30. The method of claim 16, comprising directing the dilute water to the reactor as the dilution water.

31. A method of recovering nutrients from wastewater comprising organic matter, the method comprising:

producing the wastewater comprising organic matter without subjecting the organic matter to a drying process;

controlling a concentration of dissolved ions in the wastewater comprising organic matter to reduce or avoid inhibition of oxidation by directing dilution water to the wastewater comprising organic matter, as needed;

introducing the wastewater comprising organic matter and an oxidant into a reactor to produce an intermediate nitrogenous liquid comprising oxy-anions of nitrogen;

maintaining the intermediate nitrogenous liquid at a predetermined pH to control a concentration of the oxy-anions of nitrogen and produce a stabilized nitrogenous liquid; and concentrating the stabilized nitrogenous liquid to produce a concentrated liquid product and a dilute water.

32. The method of claim 31, further comprising introducing a base into the reactor.

33. The method of claim 31, wherein the predetermined pH is between 3 and 9.

34. The method of claim 31, wherein maintaining the intermediate nitrogenous liquid at the predetermined pH comprises controlling a rate of introduction of the oxidant, controlling a rate of introduction of the nitrogenous liquid waste having dissolved organic matter, introducing a predetermined amount of a base into the nitrogenous liquid waste having dissolved organic matter, or a combination thereof.

35. The method of claim 31, further comprising directing the dilute water to an on-site demand.

36. The method of claim 35, wherein the on-site demand is manure flushing, irrigation, or an industrial use.

37. The method of claim 31, further comprising maintaining a temperature of the wastewater having organic matter and/or the intermediate nitrogenous liquid between about 4° C. and about 80° C.

38. The method of claim 31, wherein the oxidant comprises at least one of oxygen, ozone, a peroxide, and a halogen.

39. The method of claim 31, wherein the oxidation is catalyzed by microorganisms.

40. The method of claim 31, wherein concentrating the stabilized nitrogenous liquid comprises directing the stabilized nitrogenous liquid to a membrane based dissolved solids concentrator or an electrochemical separation device.

41. The method of claim 31, further comprising separating suspended solids from the stabilized nitrogenous liquid.

42. The method of claim 31, wherein the oxy-anions of nitrogen comprise at least one of nitrite and nitrate.

43. The method of claim 31, comprising directing the dilution water to the reactor to maintain a total dissolved solids concentration of the wastewater and/or the intermediate nitrogenous liquid between about 1 g/L and about 500 g/L.

44. The method of claim 43, wherein directing the dilution water to the reactor comprises maintaining the total dissolved solids concentration of the wastewater and/or the intermediate nitrogenous liquid between about 1 g/L and about 50 g/L.

45. The method of claim 31, comprising directing the dilute water to the reactor as the dilution water.

* * * * *